US012627497B2

(12) United States Patent
Poeppelmann et al.

(10) Patent No.: US 12,627,497 B2
(45) Date of Patent: May 12, 2026

(54) APPARATUS AND METHOD FOR DECRYPTING AN ENCRYPTED BIT SEQUENCE

(71) Applicant: Infineon Technologies AG, Neubiberg (DE)

(72) Inventors: Thomas Poeppelmann, Ennigerloh (DE); Peter PeßL, Munich (DE); Daniel Heinz, Buchloe (DE); Julius Hermelink, Munich (DE)

(73) Assignee: Infineon Technologies AG, Neubiberg (DE)

( * ) Notice: Subject to any disclaimer, the term of this patent is extended or adjusted under 35 U.S.C. 154(b) by 435 days.

(21) Appl. No.: 17/991,468

(22) Filed: Nov. 21, 2022

(65) Prior Publication Data

US 2023/0171103 A1 Jun. 1, 2023

(30) Foreign Application Priority Data

Nov. 30, 2021 (DE) .......................... 102021213560.9

(51) Int. Cl.
H04L 9/30 (2006.01)
(52) U.S. Cl.
CPC .................................. H04L 9/3093 (2013.01)
(58) Field of Classification Search
None
See application file for complete search history.

(56) References Cited

U.S. PATENT DOCUMENTS

| | | | | |
|---|---|---|---|---|
| 11,223,470 | B1* | 1/2022 | Shea ........................ | G06F 21/64 |
| 2011/0055585 | A1* | 3/2011 | Lee ........................ | H04L 9/3226 |
| | | | | 713/183 |
| 2012/0297201 | A1* | 11/2012 | Matsuda ............... | H04L 9/3073 |
| | | | | 713/189 |
| 2015/0288662 | A1* | 10/2015 | Bilogrevic ............ | H04L 65/403 |
| | | | | 713/168 |
| 2016/0118142 | A1* | 4/2016 | Sugahara ............... | G11C 29/36 |
| | | | | 714/719 |
| 2017/0366349 | A1* | 12/2017 | Lyubashevsky ...... | H04L 9/3218 |
| 2018/0365195 | A1 | 12/2018 | Rioul et al. | |
| 2019/0116035 | A1* | 4/2019 | Mustafa .................... | H04L 9/14 |

FOREIGN PATENT DOCUMENTS

| | | |
|---|---|---|
| CN | 106953875 A | 7/2017 |
| CN | 110999209 A | 4/2020 |
| DE | 602004010270 T2 | 1/2008 |

* cited by examiner

*Primary Examiner* — Raqiul A Choudhury
(74) *Attorney, Agent, or Firm* — Murphy, Bilak & Homiller, PLLC

(57) ABSTRACT

An apparatus for decrypting an encrypted bit sequence comprises a test device configured to subject the bit sequence to a statistical test in view of an expected distribution of the bits in the bit sequence in order to obtain a test result. The apparatus is configured to decrypt the bit sequence should the test result indicate that the distribution follows the expected distribution, and to not decrypt the bit sequence should the test result indicate that the distribution does not follow the expected distribution.

20 Claims, 9 Drawing Sheets

APPARATUS AND METHOD FOR DECRYPTING AN ENCRYPTED BIT SEQUENCE

TECHNICAL FIELD

The present exemplary embodiments relate to an apparatus and method for decrypting an encrypted bit sequence. Exemplary embodiments further relate to a method for statistical testing of an encrypted text.

BACKGROUND

Bit sequences can be encrypted and decrypted with the aid of what are known as crypto methods, allowing an encrypted transmission of the information contained in the bit sequence. Attackers could attempt to obtain a key used for encryption or decryption purposes in order to obtain access to the plain text and/or in order to overcome the encryption method.

Hence, there is a need of significant security in relation to encrypted bit sequences.

SUMMARY

A problem solved by the present exemplary embodiments can be considered that of enabling high security when decrypting bit sequences.

According to an exemplary embodiment, an apparatus for decrypting an encrypted bit sequence is equipped with a test device configured to subject the bit sequence to a statistical test in view of an expected distribution of the bits in the bit sequence in order to obtain a test result. The apparatus is configured to decrypt the bit sequence should the test result indicate that the distribution follows the expected distribution, and to not decrypt the bit sequence should the test result indicate that the distribution does not follow the expected distribution.

According to an exemplary embodiment, a method is provided which comprises an implementation of a statistical test on a received encrypted bit sequence and in view of an expected distribution of bits in the bit sequence in order to obtain a test result. The method further comprises a decryption of the bit sequence should the test result indicate that the distribution follows the expected distribution. Alternatively, should the test results indicate that the distribution does not follow the expected distribution, the bit sequence is not decrypted.

Further embodiments are the subject matter of dependent patent claims.

BRIEF DESCRIPTION OF THE FIGURES

Some of the embodiments described herein are explained below with reference to the attached drawings, in which.

DETAILED DESCRIPTION

Figure 1:
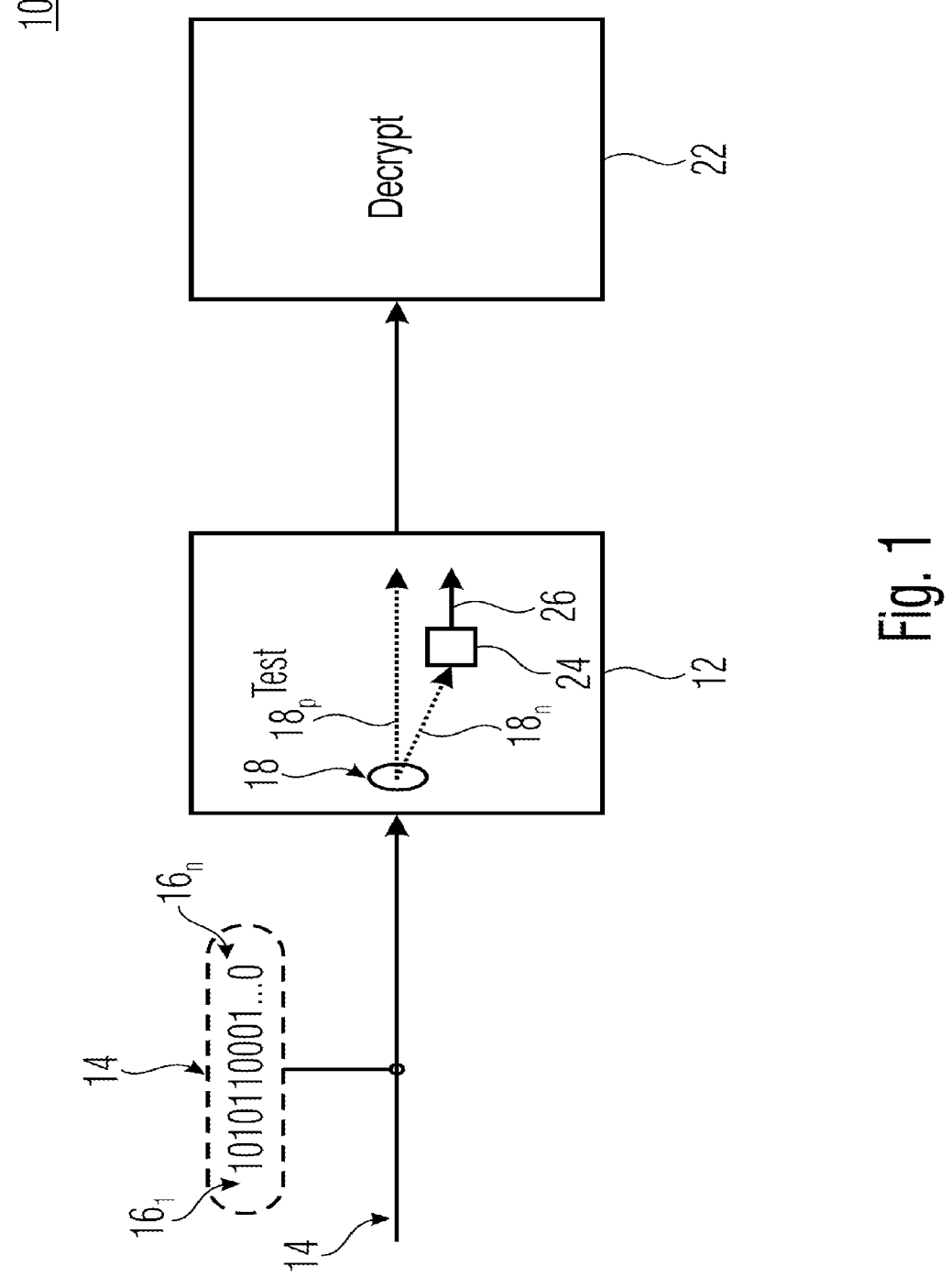
FIG. 1 shows a schematic block diagram of an apparatus according to an exemplary embodiment.

Before exemplary embodiments of the present invention are explained in more detail below with reference to the drawings, attention is drawn to the fact that identical, functionally identical or identically acting elements, objects and/or structures are provided with the same reference signs in the various figures such that the description of these elements set forth in the various exemplary embodiments may be interchanged with one another or applied to one another.

Exemplary embodiments described below are described in conjunction with a multiplicity of details. However, exemplary embodiments may also be implemented without these detailed features. Moreover, for the sake of clarity, exemplary embodiments are described using block diagrams as a replacement for a detailed representation. Further, details and/or features of individual exemplary embodiments can readily be combined for as long as nothing is explicitly described to the contrary.

Present exemplary embodiments relate to the technical field of cryptography, which may include both an encryption and a decryption of bit sequences. In this case, some of the embodiments described herein are directed to a conditional decryption of bit sequences, especially in the context of what are known as lattice-based cryptosystems. Apparatuses and/or methods according to the exemplary embodiments described herein may represent parts of such a lattice-based cryptosystem. For example, Kyber and Saber are exemplary lattice-based cryptosystems. Irrespective thereof, the advantages obtained by the present exemplary embodiments may also be obtained using different systems.

Technical background relating to the exemplary embodiments described herein is explained below. In this case, reference is made to the lattice-based cryptography and the associated terminology.

Lattice-Based Encryption

This section mentions the problem, post-quantum cryptography (POC), the definition of a lattice, the definition of a cryptosystem (public-key-encryption PKE, key exchange —KEX, signature—SIG), and lattice-based cryptography, and a general description of lattice-based cryptography is provided.

Various Internet and industrial standards use asymmetric cryptography on the basis of RSA or elliptic curve cryptography (ECC) to protect data communication between smartcards, smartphones, computers, servers or industrial control systems. By way of example, an encryption method with a public key (public-key encryption, PKE) can be realized using the RSA algorithm. This allows an encrypted email (e.g., using PGP/GPG or S/MIME) to be sent to a receiver without having to exchange a symmetric key via a security channel in advance—the public key of the receiver is sufficient to obtain confidentiality. Digital signatures, likewise based on RSA or ECC, are further applications of asymmetric cryptography. These can be used to sign and verify data, with the public key being used to verify the validity of a signature. If digitally signed contracts or long-term archives are modified post signature, even only in terms of a single bit, then the verification of the digital signature fails.

Both PKE and digital signatures together are of decisive importance for the transport-layer security (TLS) protocol, which forms the backbone of secure communication on the Internet and which is used by browsers, smartphones and increasingly IoT apparatuses as well. TLS establishes a secure channel between two apparatuses, in which communication is encrypted and tested for manipulation and in which the identity of the participants is verified with the aid of a digital certificate which is provided via infrastructure with a public key (public-key infrastructure, PKI). The browser uses TLS when connecting to a website, for example of a bank, using https for the connection instead of http. As a rule, a green padlock and further information are displayed to indicate that the communication truly is with the bank's website and that attacks by what is known as a man in the middle are prevented. Without such a PKI-based identity test in combination with secure data encryption, an attacker could manipulate the communication and masquerade as the called website.

However, the fact that RSA and ECC are susceptible to attack by quantum computers has been known since 1994, due to work by Peter Shor. A quantum computer can be described as a computer that directly utilizes quantum mechanical phenomena in order to accelerate processing. What are known as quantum bits or qubits, which are used for storing the state in a quantum register, are decisive concepts for the structure of a quantum computer. To date, there are no quantum computers powerful enough (e.g., having a sufficient number of qubits) to implement Shor's approach. However, this still is a general motivation to shift from conventional asymmetric cryptosystems (RSA/ECC) to systems that cannot be successfully attacked by quantum computers. Even if quantum computers currently require more work on account of their technical complexity and their technical challenges, they might be able to crack RSA and ECC in the polynomial time within a certain time frame (maybe in 15 to 20 years). As a consequence, there is a need for new solutions for signature methods, key exchange and encryption with public keys that are not based on the same fundamentals as RSA and ECC (i.e., discrete logarithm problem or factorization). This need for new technical solutions has already been acknowledged by standards bodies such as the NIST (National Institute of Standards and Technology), which is now in the process of examining alternative cryptosystems.

The term cryptosystem is understood to refer to cryptographic methods for encryption and the corresponding methods for decryption, using a public key, for key exchange or for signature methods, but also to very modern methods such as homomorphic encryption or attribute-based encryption. As used herein, the term cryptosystem should further be understood to refer to cryptographic techniques that rely on computer/hardware-based operations that, because of the sheer volume of computing required, cannot be performed by humans in practical time frames, whether in the brain alone or with the aid of pencil and paper. Thus, the terms cryptosystem and cryptography, within the context of the present disclosure, is expressly limited to hardware-based devices and techniques. Within the scope of encryption with a public key, a non-secret public key is used to encrypt data, which can only be decrypted with the associated secret key. Within the scope of signature methods, a secret key is used to sign a message, and the associated public key can be used to verify whether the signatory was in possession of the secret key and consequently was authorized to create the signatures. Key exchange, key establishment mechanisms (KEM) or key transport methods are considered to be interactive protocols, within the scope of which two parties establish a secret key which is unknown to a passive or sometimes even active adversary or eavesdropper. A person skilled in the art is also aware of the various options of combining miscellanea such as symmetric key cryptography (e.g., AES), hash functions (e.g., SHA2), encryption with public key, key exchange or signature methods in protocols such as transport layer security (TLS), Internet Key exchange (IKE), Internet protocol security (IPsec) or Kerberos.

Lattice-based cryptosystems are a class of systems that should withstand attacks by quantum computers. Lattice-based cryptosystems can be considered the successors of RSA and ECC and operate either with large matrices (standard lattice) or with polynomial rings (ideal lattice).

A lattice is a structure formed by integer linear combinations of basis vectors. Thus, a lattice can be described as a regular structure in an n-dimensional space. More precisely, a lattice is defined as an arrangement of points in a Euclidean space with a regular structure. In the case of n linearly independent vectors $b_1, \ldots, b_n \in \mathbb{R}^m$, the lattice $\mathcal{L}$ produced by same is defined as $\mathcal{L}(b, \ldots, b_n) = \{\Sigma x_i b_i | x_i \in \mathbb{Z}\}$. $b_1, \ldots, b_n$ is defined as the basis of the lattice, and $\mathbb{R}^m$ is a vector with real coefficients. Within a lattice $\mathcal{L}$ (i.e., a n-dimensional space), certain fundamental problems, for example finding a short basis or a short vector, are considered mathematically difficult or at least mathematically complicated enough to use these for cryptography. As a rule, the difficulty of cracking a lattice-based cryptosystem can be traced back or reduced to the difficulty of solving such a fundamental problem. Consequently, lattice-based cryptography or a lattice-based cryptosystem relates to a cryptographic system or a cryptographic structure whose security is based on the difficulty of certain difficult mathematical problems in lattices or which is related to the difficulty of these problems. However, lattices within the meaning of the definition given above need not necessarily be visible to the expert when a system is implemented. The lattice is mainly a tool for the security verification or the estimation of parameter sizes, and the structures used for the system may be different.

Lattices have already been used for decades in the construction of cryptosystems. Recently, lattice-based cryptography has likewise drawn much attention as a result of the introduction of the problem of user-friendly learning with errors (LWE) and the ring LWE (RLWE) problem. In this context, a "problem" relates to a mathematical problem (of, for example, finding something) which is conjectured to be hard to solve (e.g., no polynomial time algorithm is available) but which also allows the construction of a cryptographic system (e.g., the factorization problem for RSA or the discrete logarithm for ECC). To solve the LWE problem, it is necessary in general to restore a secret vector s in $\mathbb{Z}_q^n$ when a sequence of approximative (i.e., randomly disturbed) random linear equations in s are obtained. The LWE and RLWE problems thus enable the construction of systems in which the actual lattice structure is not really visible to the developer of a system. However, lattice algorithms are used when solving LWE or RLWE problems, since the problem of finding s is described as a lattice problem. The RLWE problem works over polynomial rings and supports a security reduction to difficult problems in ideal lattices while LWE allows reductions to arbitrary lattices. As a consequence, ideal lattices have more structure, since not all lattices are ideal lattices, but they also allow the design of systems which obtain practicable public key length, ciphertext length and signature lengths.

Prominent examples of lattice-based cryptography, known to persons skilled in the art, are the so-called NTRU and NTRUSign systems, and the so-called Goldreich-Goldwasser-Halevi (GGH) system. NTRU can be considered to be an abbreviation for Number Theory Research Unit, but is known to the person skilled in the art simply as NTRU cryptosystem. Examples of lattice-based (ephemeral) key exchange methods or public key encryption methods include the Kyber, NewHope, Hila5, ThreeBears and Frodo methods. It should be noted that in most methods the conversion between key exchange and encryption with public key is trivial. Moreover, different security levels can be obtained for PKE, for example semantic security in relation to attacks with adaptively chosen plaintext (chosen plaintext attack, CPA) or semantic security in relation to attacks with adaptively chosen ciphertext (chosen ciphertext attacks, CCA), by standard conversions (e.g., Fujisaki-Okamoto). This was shown in exemplary fashion for the NewHope method, which can also be instantiated as CPA-secure or CCA-secure PKE. It should be noted that NewHope-Simple and other systems are a direct adaptation of a system called LPR10, which was published in 2010. Examples of lattice-based signature methods include Dilithium, BLISS, GLP12, Falcon and Tesla.

Technical Challenges of Lattice-Based Cryptography

The technical nature and the definition of specific technical challenges solved by the exemplary embodiments are explained below.

A number of technical challenges arise when carrying out cryptographic processes (e.g., signing, encrypting, decrypting, verifying, key generation) in the realization of lattice-based cryptography and lattice-based cryptosystems (e.g., NewHope, Dilithium, NTRU) on computers, microcontrollers or as an integrated circuit in a hardware-software codesign approach or as a fixed circuit. Examples of technical challenges in this field include:

1. Obtaining optimal performance by carrying out certain steps of a cryptosystem using specifically optimized algorithms and by use of all features of the available target hardware (specific registers or commands, specific functions realized in the hardware which do not come as a standard, e.g., co-processors).

2. Carrying out a cryptographic process using a minimal amount of volatile or non-volatile memory 3. Realizing a cryptographic process or parts thereof using a minimal number of logic circuits and memory cells (e.g., in a CMOS process), while taking account of a performance target.

4. Having efficient and comprehensive protection against implementation attacks (also referred to as physical attacks, observation attacks, invasive and semi-invasive attacks), while taking account of or in combination with or without the challenges 1-3.

It should be noted that protection against implementation attacks/physical attacks is required should cryptosystems be implemented on a secure chip card controller or in a disadvantageous environment (e.g., on a hardware security module). Possible attack vectors include side channel attacks, within the scope of which an attacker attempts to obtain secret information by virtue of observing the physical behavior of an apparatus, for example power consumption (simple and differential power analysis (SPA/DPA)), electrical emission or temperature. Moreover, fault attacks are an option, within the scope of which an attacker attempts to introduce disturbances (e.g., using a laser) into the execution procedure or the data in order to obtain secret information or in order to influence the behavior of an apparatus. An implementation attack is distinguished in that same does not exploit a weakness in the mathematical description of a method (which would be considered cryptoanalysis) but instead exploits the manner in which the method is realized on a certain apparatus. In general, the assumption is made that the attacker has access to the apparatus when carrying out an implementation attack. Normally, an apparatus such as a smartcard is constructed in such a way that it is difficult to reach security-critical features. A common approach for defending physical attacks lies in the embodiment with randomized values in order to prevent invasive and non-invasive attacks with the target of extracting a secret key or an intermediate value from an apparatus. However, there is a technical challenge in efficiently realizing such instances of randomization or redundancy without opening up further attack vectors.

Details for Realizing Lattice-Based Cryptography—Notation and Mathematical Background The following notation, abbreviations and references are used globally in this case, while other objects such as variables and polynomials may be defined locally:

q is an integer, k is an integer, n is an integer, mod q is the modulo operation modulo q, which is defined over integers, where the result lies in the range [0, q−1], Z are the integers (numbers written without a fraction), $\mathbb{R}$ are the rational numbers (numbers which may have a fraction), q is the ring of integers modulo q, which is the quotient ring Z/qZ of the equivalence classes of integers modulo q. The quotient ring is a construction in abstract algebra X is the indeterminate number, f is a polynomial of maximum degree of integer n, $R=Z[X]/(f)$ is a ring of integer polynomials modulo f; the elements $v \in Z[X]/(f)$ can be represented by integer polynomials of a degree less than the integer n or alternatively as vector of the coefficients $\in Z^n$, $R_q = Z_q[X]/(f)$ is a ring of integer polynomials modulo both the polynomial f and the integer q; the elements $V \in Z_q[X]/(f)$ can be represented by integer polynomials of a degree less than n with coefficients, reduced modulo q, or alternatively as a coefficient vector $v \in Z_q^n$, $v \in R_q$ is a polynomial (in bold) which is an element in $R_q$, $V[i]$ is a coefficient of a vector or polynomial $v \in R_q$ at a position i, θ error distribution, $\leftarrow^S$ $\leftarrow^S$ random sampling from a set or distribution, $D_{z\sigma}$ discrete Gaussian distribution over the integers with standard deviation σ, $\psi_k$ binomial distribution with integer parameter k, UO uniform distribution, $1001_b$ a number written in binary, such that $1001_b = 9$, U($R_{q,k}$) uniformly distributed random sampling of a polynomial in $R_q$, where all coefficients are uniformly distributed randomly in [−k, k], FFT Fast Fourier Transform, NTT Number theoretic transform, DPA Differential power analysis, SPA Simple power analysis, ALU Arithmetic logic unit Ideal Lattices and Polynomial Arithmetic Provided below is a definition of $R_q$, a definition of polynomial addition and multiplication, and a definition of the NTT.

Currently, there are two types of lattice-based cryptography, specifically the lattice-based cryptography with ideal lattices and the lattice-based cryptography with standard lattices. What is known as modular lattice-based cryptography, which mixes concepts from ideal lattices and standard lattices, strikes a balance between these. For further details, reference is made to.

The basic operations in lattice-based cryptography with ideal lattices are polynomial multiplications, additions or subtractions in the quotient ring:

$$R_q = Z_q[X]/(f),$$

where the modulus q is an integer and the dimension (number of coefficients) is an integer n. A polynomial $a \in R_q$ can be represented by an array of values and a single value a[i] at the integer position i can be accessed. An array of values is a physical representation (e.g., in the memory) while a polynomial is a mathematical object. Arrays and polynomials are implicitly treated as the same as they can be converted into one another or only are different representations. In summary, it should be noted that all important calculations in lattice-based cryptosystems can be carried out using arrays of values modulo q (i.e., the coefficients are in $Z_q$). The reduction modulo q can be carried out once a value is greater than or equal to q, or a value can be allowed to grow if the data structure containing the value still has sufficient space, and a reduction modulo q may be carried out only at the end of a calculation (a so-called "lazy reduction").

For quotient rings, it is possible to define operations such as addition, subtraction, multiplication and division, which are cumulative and associative. An addition c=a+b for a, b, $c \in R_q$ may be defined as:

$$c = \Sigma_{i=0}^{n-1}(a[i] + b[i] \bmod q) \cdot X^i,$$

where i is an integer, q is an integer, a[i] is the i-th coefficient of a and b[i] is the i-th coefficient of b, and X is the indeterminate. The subtraction c=a−b works in the same way, with "+" replaced by "−".

The product c=a·b of polynomials a, b, $c \in R_q$ can likewise be calculated. It is defined as a polynomial multiplication followed by a reduction modulo of the polynomial f and a reduction modulo of the integer q. Consequently, the following applies:

$$c = \left( \sum_{i=0}^{n-1}\sum_{j=0}^{n-1} a[i]b[j]x^{i+j} \bmod q \right) \bmod f.$$

If the algorithm as described above is implemented or carried out, it is sometimes also referred to as a "schoolbook" multiplication algorithm and requires approximately $n^2$ multiplications in $Z_q$. The formula for polynomial multiplication can be simplified if the special rule is considered that $x^n \equiv -1$ (convolution) if $f=x^n+1$ (negative cyclic convolution), but similar polynomials can be used accordingly. Consequently, the following applies:

$$c = \sum_{i=0}^{n-1}\sum_{j=0}^{n-1}(-1)^{\lfloor \frac{i+j}{n} \rfloor} a[i]b[j]x^{i+j \, mod \, n} \bmod q,$$

where i and j are integers, q is an integer, a[i] is the i-th coefficient of a and b[j] is the j-th coefficient of b, and x is the indeterminate.

"Sparse" Multiplication

An increased efficiency in the polynomial arithmetic can be obtained by algorithms that exploit certain properties of polynomials. For example, a polynomial $s \in R_q$ may have only a few coefficients that are non-zero, or may consist only of coefficients that are either one or negative one, or may have small coefficients in general, or comprise a combination of these properties. The optimization of such polynomial arithmetic is a standard technique and is sometimes referred to as "sparse" multiplication if only a few coefficients are defined.

Number Theoretic Transform (NTT)

As already mentioned, an implementation according to the schoolbook formula $n^2$ would require modular multiplications (i.e., multiplications in $Z_q$), and would therefore be quite expensive in relation to the number of computational operations to be carried out. The number theoretic transform (NTT) is another approach for fast polynomial multiplication. In principle, NTT is a Fast Fourier Transform (FFT), which is defined over a finite body or ring.

In the process, all complex roots of unity of the FFT were replaced by the integer roots of unity and the calculations are carried out in the ring of integers modulo of an integer q. A polynomial multiplication for a, b, $c \in R_q$ using the NTT can be calculated as c=a·b=NTT⁻¹(NTT(a)∘NTT(b)), where ∘ denotes a coefficient-wise multiplication, NTT(a) denotes the transformation of the polynomial a, NTT(b) denotes the transformation of the polynomial b, and NTT⁻¹( ) denotes the inverse transformation. The coefficient-wise multiplication c=a∘b for a, b, $c \in R_q$ can be defined as:

$$c = \Sigma_{i=0}^{n-1}(a[i] + b[i] \bmod q) \cdot X^i.$$

The advantage of the NTT is that an operation requires only approximately $n \log_2 n$ modular multiplications if an efficient algorithm is used, and that the reduction modulo $f=x^n+1$ (what is known as a circular convolution property) or $f=x^n-1$ can be integrated in the NTT algorithm. Consequently, an n-point NTT is sufficient to work with n-coefficient polynomials. However, the NTT can also be used to carry out an efficient multiplication for any values of f. In this case, a 2n-point NTT is used, and a reduction modulo f subsequently carried out.

To formally introduce the NTT, the choice of parameters is restricted and $f=x^n+1$ and the prime number $q \equiv 1 \bmod 2n$ are defined such that the NTT exists. For a polynomial $g = \Sigma_{i=0}^{n-1} g[i]X^i \in R_q$, the following is defined:

$$NTT(g) = \hat{g} = \Sigma_{i=0}^{n-1} \hat{g}[i]X^i, \text{ with } \hat{g}[i] = \Sigma_{j=0}^{n-1} y^j g[i]\omega^{ij} \bmod q,$$

where γ is an n-th primitive root of unity and $\gamma = \sqrt{\omega}$ is mod q.

The back transformation is similar to the forward transformation. For a polynomial $\hat{g} \in R_q$, the following is defined:

$$NTT^{-1}(\hat{g}) = g = \Sigma_{i=0}^{n-1} g[i]X^i \text{ with } g[i] = (n^{-1}y^{-i}\Sigma_{j=0}^{n-1} \hat{g}_j \omega^{-ij}) \bmod q.$$

A simple calculation of the NTT following the definition given above would have quadratic complexity and would not be more efficient than the schoolbook approach. Hence, a fast algorithm for calculating the NTT is required to realize a fast polynomial multiplication with the aid of the convolution theorem. The simplest implementation of the NTT with O(n log n) operations in $Z_q$ is a Cooley-Tukey radix-2 decimation-in-time (DIT) algorithm or a decimation-in-frequency (DIF) algorithm. The DIT-NTT algorithm recursively splits the calculation into a sub-problem on the even inputs and a sub-problem on the odd inputs of the NTT.

Calculation of a Polynomial Inverse

The calculation of the inverse is often required in signatures and may be used for the implementation of security measures.

Some algorithms require the calculation of an inverse of a polynomial $a^{-1}$ for $a \in R_q$, and so $a \cdot a^{-1} = 1$. One approach to calculating the multiplicative inverse of integers in $Z_q$ and also $R_q$ is Fermat's little theorem, which is known to a person skilled in the art. The multiplicative inverse of the polynomial $a^{-1}$ can be calculated as $a^{-1} = a^{q-2}$. This process can be accelerated by the NTT, and conventional exponentiation methods such as (right-to-left or left-to-right) binary exponentiation (square-and-multiply) or an addition chain are available. When a is transformed into the NTT domain, a multiplication is only a coefficient-wise multiplication. For example, $a^3$ can be calculated as $a' = NTT(a)$ and $a^3 = NTT^{-1}(a' \circ a' \circ a')$, which is generally faster than the calculation of $a^3 = a*a*a$ with algorithms such as schoolbook multiplication or Karatsuba multiplication. Using an addition chain, the number of coefficient-wise multiplications can be reduced further, depending on the share of q. As an example for $q=12289$, it is possible to use an additional chain which requires 18 polynomial multiplications. The bit-wise processing of the exponent $12289-2=12287=10111111111111_b$ using a square-and-multiply algorithm would require 25 polynomial multiplications.

Randomness and Random Sampling

All these distributions may be used if work is carried out with lattice-based cryptography according to exemplary embodiments.

In this context, $a \leftarrow^S S$ denotes the independent and uniformly distributed random selection of the variable a from a set S or a certain distribution S. Attention is drawn to the fact that "random" or "uniformly distributed" in this context (e.g., random selection or any random value) may refer to a true random value, a pseudorandom value or a deterministic approach for determining a value. Thus, the property of such "randomness" or a certain random effect according to the present proposition may consist of an attacker not knowing the value and the values being different in the case of at least some of the operations. In particular, the randomness adds a certain degree of entropy between the values, which are determined "randomly", for example generated or selected. For a finite S, the uniform distribution on S is sometimes denoted by U(S). Occasionally, the notation $a \leftarrow^S U(R_{q,k})$ is also used in order to denote the uniformly distributed random sampling of $a \in R_q$, where all coefficients of a are in $[-k, k]$. For a probability distribution $\chi$, it is assumed that efficient sampling is possible. Sampling a variable t from $\chi$ is described by $t \leftarrow^S \chi$. The notation $a \leftarrow^S \chi^n$ is used to denote the random sampling of $a \in R_q$, where the coefficients are independent and follow $\chi$.

Sampling is understood to mean the generation of random data which follow a certain distribution. A sampler is defined to be a piece of code or a set of commands or a hardware circuit that carries out the generation. As a rule, the sampler has access to a (uniformly distributed) random source or is started using a start parameter or seed, from which pseudo-random data are generated. The sampling of secret noise or error vectors is a basic task within the scope of lattice-based encryption with public keys (PKE), within the scope of key exchange, within the scope of signature methods and other methods (e.g., homomorphic encryption). A special feature of such noise or error vectors is that they are small (i.e., with coefficients close to zero) as a rule.

The discrete Gaussian distribution $D_{z,o}$ with a mean value 0 and standard deviation $\sigma > 0$ over the integers assigns $x \in Z$ the probability $\rho_o(x)/\rho_o(Z)$, for $\rho_o(x) = \exp(-x^2/2\sigma^2)$ and $\rho_o(Z) = 1 + \Sigma_{i=1}^{\infty} \rho_o(i)$. Thus, $a \leftarrow^S D_{z,o}$ denotes the process of random sampling of a value $d \in Z$ according to $D_{z,o}$. Also, $a \leftarrow^S D_{z,o}^n$ denotes the process of random sampling of a polynomial $a \in R_q$ of dimension n, where the coefficients are independent and distributed according to $D_{z,o}$. A sampler which generates values according to discrete Gaussian distribution can be implemented by a person skilled in the art who has access to a source of random bits by using the cumulative distribution function (CDF) or a cumulative distribution table (CDT) or using highly precise calculations. Other approaches include the Knuth-Yao algorithm, the rejection method or the Ziggurat algorithm.

Since the generation of random numbers with a Gaussian distribution is still costly, a number of pieces of work have proposed the use of noise distributions where it is easier to sample random numbers in the case of the discrete Gaussian distributions. This is important since the implementation of a cryptographic method generally requires 510 to 4096 samples from the noise or error distribution. The binomial distribution $\psi_k$ is a distribution that is easier to use. A sample from $\psi_k$ can be generated by calculating $\Sigma_{i=0}^{k-1} b_i - b_i'$, where $b_i$, $b_i' \in \{0,1\}$ are uniformly distributed independent bits. Thus, $a \leftarrow^S \psi_k$ denotes the process of randomly selecting a value $d \in Z$ according to $\psi_k$. Also, $a \leftarrow^S \psi_k^n$ denotes the process of random sampling of a polynomial $a \in R_q$ of dimension n, the coefficients of which are independent and distributed according to $\psi_k$. The standard deviation of the binomial distribution is $\sqrt{k/2}$ and the variance is $k/2$. An alternative approach for the sampling from $\psi_k$ lies in the calculation of $(\Sigma_{i=0}^{2k-1} b_i) - k$, where $b_i \in \{0,1\}$ are uniformly distributed independent bits. A person skilled in the art is able to implement a sampler of the binomial distribution should they have access to a source of random bits. One approach consists of obtaining two random bit strings $v_1$, $v_2$, each of length k, in order to calculate the integer Hamming weights $h_1 = HW(v_1)$ and $h_2 = HW(v_2)$ and then output $h_1 - h_2$ as a result of the sampler.

Mathematical Problems on Lattices

The ring-learning-with-errors (RLWE) problem is a standard problem and is explained to provide understanding of the methods.

The security of lattice-based cryptosystems may be based on or be linked to certain problems and variants thereof. Such specific problems, which are known to a person skilled in the art, are:

The learning-with-errors (LWE) problem

The ring-learning-with-errors (RLWE) problem

The short-integer-solution (SIS) problem

The ring-short-integer-solution (RSIS) problem

The NTRU problem

This section provides an informal definition of the RLWE problem. Let R be the ring $R_q = Z_q[X]/(X^n+1)$, where n is an integer power of 2 and q is an integer. The RLWE problem for $m>0$ samples, modulo q and with error distribution $\vartheta$ over Z, is defined as follows:

To find the secret polynomial s for suitable values of n, q, suitable choice of $\vartheta$, secret $s \in R_q$ and $a \in R_q$, both with uniformly distributed coefficients in $Z_q$, and given integer m samples of the form (a; b=a·s+e), where $e \in R_q$ has coefficients sampled from $\vartheta$.

The RLWE problem transfers the known LWE problem into the ring environment. The difficulty of the RLWE problem is based on the worst-case hardness of short vector problems on ideal lattices, which are a subclass of standard lattices. The RLWE problem also has a decision version (decision whether b originates from the RLWE distribution or is uniformly distributed if the polynomials a, $b \in R_q$ are given), which is considered to be equivalent in terms of hardness to the search version for certain parameters. It is also possible to take the secret $s \in R_q$ from the error distribution $\vartheta$ rather than from the uniform distribution $U(R_q)$. This form of the RLWE problem (and also of the standard LWE problem) is sometimes referred to as "Hermite normal form". The RLWE problem was found to be hard if the error distribution is a discrete Gaussian distribution of high precision ($\vartheta = D_{z,\sigma}{}^n$) and the parameters are chosen in a certain way. However, in practice, this problem remains hard even in the case of discrete Gaussian distributions sampled with less precision, in the case of the binomial distribution ($\vartheta = \psi_k{}^n$) or in the case of a small uniform distribution $\vartheta = U(R_{q,k})$.

Standard Lattice

The operations in lattice-based cryptography with standard lattices comprise matrix-matrix multiplications, matrix-vector multiplications or vector additions and vector subtractions, with the coefficients being values in the ring of integers modulo q.

Encryption with the Public-Key and Key Exchange Method

A relation to a few methods is established here in order to highlight the broad applicability of the techniques described herein or in order to highlight what is changed within the scope of exemplary embodiments present, and what combinations are possible.

The properties of the RLWE problem can be used to implement a semantically secure public-key encryption method with a reduction to a decision-based RWLE. Thus, the simple version only achieves security vis-à-vis chosen plaintext attacks (CPA) and is classified as a lattice-based cryptosystem since the hardness is based on the hardness of the RLWE problem, which in turn is based on the hardness of certain lattice problems. The general concept of the system consists in hiding the secret key in an RLWE sample, which becomes the public key ($p=r_1-a·r_2$, the "−" sign is only a technical peculiarity) and in masking the message using an RLWE sample ($p·e_1+e_3$). In this way, the public key and every ciphertext appears uniformly random to a passive attacker, and semantic security is attained. The method referred to here is usually ascribed either to Lyubashevsky, Peikert and Regev or Lindner and Peikert. It was presented in a presentation by Peikert at Eurocrypt'10.

RLWE.CPA.Gen:
1. $a \leftarrow U(R_q)$ is chosen
2. $r_1 \leftarrow^S \vartheta$
3. $r_2 \leftarrow^S \vartheta$
4. public key (pk): $p = r_1 - a·r_2 \in R_q$
5. secret key. (sk): $r_2$
6. pk=a, p, sk=$r_2$ is returned
RLWE.CPA.Enc(a, p, m$\in\{0,1\}^n$)
1. $e_1 \leftarrow^S \vartheta$
2. $e_2 \leftarrow^S \vartheta$
3. $e_3 \leftarrow^S \vartheta$ 4. $\overline{m}$=encode(m).
5. $[c_1 = a·e_1+e_2, c_2 = p·e_1+e_3+\overline{m}]$ is returned
RLWE.CPA.Dec(c=[$c_1$, $c_2$], $r_2$):
1. decode($c_1·r_2+c_2$) is returned Generally, the method is instantiated in the polynomial ring $R_q$, but the use of other rings is possible without problems. A possible choice for the error distribution $\vartheta$ is $D_{z,\sigma}{}^n$ or $\psi_k{}^n$. The key generation method RLWE.CPA.Gen only requires the random selection of two noise polynomials $r_1$, $r_2$ from the error distribution $\vartheta$. The public key is a and $p=r_1·a·r_2$. The polynomial a may be chosen during the key generation (as part of any public key) or may be considered a global constant, or it can be generated on-the-fly on the basis of a seed. The polynomial $r_1$ is only used during the key generation and is subsequently discarded, while $r_2$ is the secret key. Extracting $r_2$ from the public key p is tantamount to solving the RLWE problem.

The encryption method RLWE.CPA.Enc requires the selection of three noise polynomials $e_1$, $e_2$, $e_3$ from the error distribution $\vartheta$. To hide the message in the ciphertext, it is encoded as $\overline{m}$ and added to $p·e_1+e_3$. The ciphertext consists of $c_1$ and $c_2$, which in principle both are RLWE patterns in Hermite normal form. The security vis-á-vis chosen plaintext attacks (CPA) arises from the fact that everything returned by the encryption algorithm cannot be distinguished from randomness.

The decryption method RLWE.CPA.Dec requires knowledge of the secret key $r_2$, since it is otherwise not possible to eliminate the large term $r_2ae_1$ in the calculation of $c_1r_2+c_2$. Encoding the n-bit message li is required because after the calculation of $c_1r_2+c_2$ there still is low noise (i.e., $r_2e_2+r_1e_1+e_3$), which would prevent a retrieval of the message following decryption.

$$c_1r_2+c_2=(ae_1+e_2)r_2+pe_1+e_3+$$
$$\overline{m}=r_2ae_1+r_2e_2+r_1e_1-r_2ae_1+e_3+\overline{m}=\overline{m}+r_2e_2+r_1e_1+e_3$$

It should be noted that the noise is relatively low since all noise terms are taken from the error distribution $\vartheta$. Threshold value encoding functions for individual coefficients have been proposed for handling the remaining noise.

Example parameters for instantiating the method are:
(n=256, q=4093, $\vartheta = D_{z,\sigma}{}^n$ $\sigma$=8.35), to which roughly 100 bit security is attributed,
(n=512, q=12289, $\vartheta = D_{z,\sigma}{}^n$ $\sigma$=11.31), to which roughly 128 bit security is attributed, and
(n=1024, q=12289, $\vartheta = \psi_k{}^n$ k=16), to which roughly 256 bit security is attributed.

Description of the Güneysu-Lyubashevsky-Pöppelmann (GLP12) Method

In 2012, Güneysu, Lyubashevsky and Pöppelmann proposed a signature method which is a combination of earlier methods by Lyubashevsky and an additional optimization, which enables a reduction in the signature length by virtually a factor of two. The security of the method is based on a lattice-related problem, in which one is given an ordered pair of polynomials (a, t)$\in R_q \times R_q$, where a is chosen uniformly from $R_q$ and $t=as_1+s_2$, where $s_1$ and $s_2$ are chosen uniformly from $\{-k, \ldots, k\}^n$, and is requested to find an ordered pair ($s_1$, $s_2$) such that $as_1+s_2=t$. Thus, it is similar to the RLWE problem.

Two versions of the GLP signature method were proposed. This section only presents the "optimized" variant which, in comparison with the "base" variant, contains a compression algorithm for the second component of the signature.

GLP.GEN( )
1) $a \leftarrow^S R_q$
2) $s_1, s_2 \leftarrow^S R_1$

3) $t = as_1 + s_2$

4) $pk = (t, a)$ and $sk = (s_1, s_2)$ are returned

GLP.SIGN$(\mu \in \{0,1\}^*, sk = (s_1, s_2), pk = (t, a))$

1) $y_1, y_2 \leftarrow^S R_{q,k}$

2) $c = H((ay_1 + y_2)^{(1)}, \mu)$

3) $z_1 = s_1 c + y_1$

4) $z_2 = s_2 c + y_2$ 5) if $z_1$ or $z_2 \notin R_{q,k-21}$, then return to step 1

6) $z_2' = $ Compress $(az_1 - tc, z_2, k-32)$ 7) if $z_2 = \perp$, then return to step 1

8) sig $= (z_1, z_2', c)$ is returned

GLP.VERIFY$(\mu \in \{0,1\}^*, sig = (z_1, z_2', c), sk = (s_1, s_2))$

1) Accept if and only if $z_1, z_2' \in R_{q,k-32}$ and $H((az_1 + z_2' - tc)^{(1)}, \mu) = c$ The key generation algorithm GLP.GEN( ) essentially requires a sampling of random polynomials $s_1, s_2 \in R_q$, followed by a polynomial multiplication and an addition. The polynomials $s_1$ and $s_{12}$ have small coefficients in $\{-1, 0, 1\}$, while all coefficients of a and t are uniformly random in $Z_q$. The private key $sk = (s_1, s_2)$ consists of the values $s_1, s_2$, and the public key is $pk = (t, a)$. To extract the secret key from the public key, an attacker would have to solve the search version of the DCK problem.

The signing method GLP.SIGN takes the message $p \in \{0, 1\}'$, the secret key sk and the public key pk. In step 1, two polynomials $y_1, y_2$ are chosen uniformly at random with coefficients in the range $[-k, k]$. In step 3, a hash function H is applied to the higher-order bits (denoted by $(*)^{(1)}$) of $ay_1 + y_2$, as a result of which a polynomial $c \in R_q$ is output, in which the first 160 bits of the hash output are interpreted as a sparse polynomial. In steps 3 and 4, $y_1$ and $y_2$ are used to mask the private key by virtue of $z_1$ and $z_2$ being calculated. The algorithm is only continued if all coefficients of $z_1$ and $z_2$ are in the range $[-(k-32), k-32]$, otherwise it is restarted. The polynomial $z_2$ is then compressed by the compression function in step 6 to form $z_2'$. This compression is part of the aggressive size reduction of signature sig $= (z_1, z_2', c)$, since only a few parts of $z_2$ are required to ensure the security of the method. For the implemented parameter set, the compression function has an error probability of less than 2 percent, which leads to a restart of the entire signing process The verification algorithm GLP.VERIFY initially ensures that all coefficients of $z_1, z_2'$ are in the range $[-(k-32), k-32]$ and otherwise does not accept the invalid signature. In the next step, $z_1 + z_2' - tc$ is calculated, transformed into the higher-order bits and hashed together with the message $\mu$. Subsequently, there is verification as to whether $((az_1 + z_2' - tc)^{(1)}, \mu)$ equals c from the signature.

FIG. 1 shows a schematic block diagram of an apparatus 10 according to an exemplary embodiment.

The apparatus 10 comprises a test device 12, i.e., test circuitry, configured to obtain a bit sequence 14 and subject the latter to a statistical test in view of an expected distribution of the bits $16_1$ to $16_n$ in the bit sequence 14 in order to obtain a test result.

The test device 12 may comprise a computing device, and may be implemented wholly or partially in hardware and/or wholly or partially in software. By way of example, the tasks of a test can be implemented by means of a suitable hardware circuit, a field programmable gate array, a control device, a processor, a microcontroller or the like: but there is also the option of using software which is executed for example on a processor or central processing unit, CPU, in order to carry out an appropriate test on the bit sequence 14.

By way of example, a test result 18p of the test by the test device 12 may indicate that the actual distribution of the bits $16_1$ to $16_n$ follows the expected distribution. A complementary result 18n may indicate that the actual distribution in the bit sequence 14 does not follow the expected distribution. To this end, the test device 12 may for example verify whether the expected distribution is at least approximately a uniform distribution. By way of example, it is possible to verify whether the number of collisions in the bit sequence does not exceed a chosen threshold value.

Consequently, the statistical test of the test device 12 allows verification as to whether the bit sequence 14 follows a uniform distribution within predetermined limits. As will be explained in more detail below, the test can also be simplified and, for example, be carried out repeatedly on a plurality of segments of the bit sequence 14 or in parallel, in order to obtain one or more test results which may then represent, either in combination or on their own, a test result 18p or 18n.

Thus, it is possible within the scope of the statistical test to determine whether the bit sequence might be the bit sequence of an attacker which has been manipulated in relation to the statistical distribution and which could enable information to be obtained when the bit sequence 14 is decrypted in a decryption device 22, i.e., decryption circuitry, of the apparatus 10. This can be made more difficult or prevented by virtue of the apparatus 10 only executing a decryption by means of the decryption device 22 if the test result 18p indicates that the distribution follows the expected distribution. In the other case, where the test result 18n indicates that the distribution does not follow the expected distribution, the bit sequence 14 is not decrypted by the decryption device 22. The decryption device 22 may be implemented wholly or partially in hardware and/or wholly or partially in processing circuitry programmed with appropriate software. In this case, the decryption device 22 may be a known decryption device, which is augmented by the test device 12 in the present exemplary embodiment.

Either as part of the test device 12 or independently thereof, the apparatus 10 may provide an additional function 24 in hardware and/or in hardware-plus-software, which, building on the negative test result, provides further functions. For example, the device 10 may be configured to produce a signal 26 which specifies that the distribution does not follow the expected distribution. By way of example, the signal 26 can be understood to be an alarm signal, allowing additional defensive measures to be taken up. By way of example, this includes the wiping of memories, the deactivation of one or more functions, the transmission of messages, or other measures.

According to an exemplary embodiment, the test device 12 is configured to determine a measure of a uniform distribution in the encrypted bit sequence 14 and by means of the statistical test. By way of example, a uniform distribution can be understood to mean that, at least within predefined limits, there are just as many zeros "0" as ones "1" as bits in the bit sequence 14.

By way of example, a test result 18 may indicate the measure of the uniform distribution and, depending on whether the measure corresponds at least to a threshold value, the test result 18p or the test result 18n can be obtained. The test device 12 can be configured to provide the test result 18 with information specifying the measure. By way of example, this can be implemented as a value while taking account of a minimum value, for example 0 or 1, and a maximum value, for example 1, 10 or 100 or the like. Alternatively, the test result could indicate whether the measure at least reaches a predefined threshold value, for example by way of indicating whether or not the predefined criterion in respect of the uniform distribution has been satisfied, for example as yes/no information. Such binary information may also be obtained by the provision of only one signal, where the absence of the signal may implicitly specify the complementary information.

Figure 2:
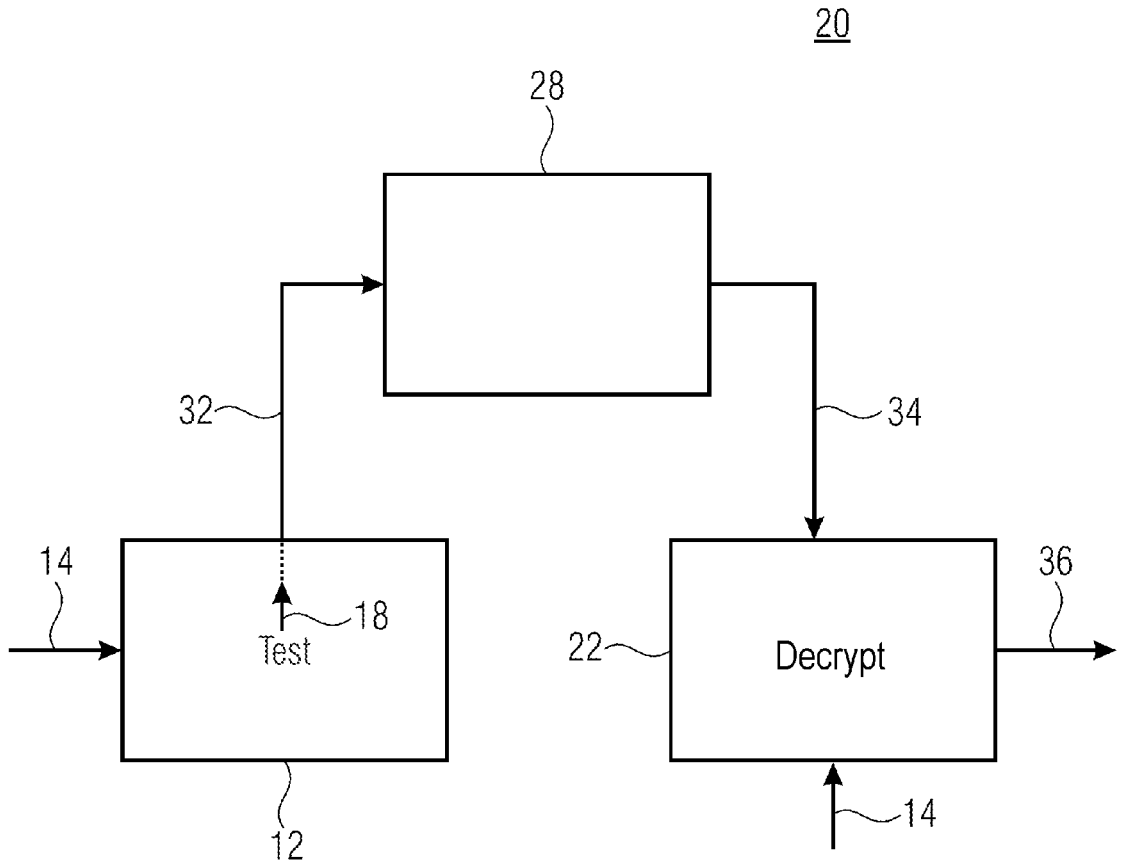
FIG. 2 shows a schematic block diagram of an apparatus with a control device according to an exemplary embodiment.

FIG. 2 shows a schematic block diagram of an apparatus 20 according to an exemplary embodiment. The apparatus 20 inter alia provides functions of the apparatus 10 and, to this end, comprises the decryption device 22 and the test device 12.

Further, a control device 28, i.e., control circuitry, is arranged and configured to evaluate the test result and to allow or prevent a decryption of the bit sequence 14 on the basis of the test result. To this end, the control device 28 may receive a signal 32 from the test device 12, with the signal 32 being able to comprise the test result 18, $18p$ and/or $18n$ or being able to provide information derived therefrom, the information enabling conclusions to be drawn about the test result 18, $18p$ or $18n$. This means the control device 28 may have knowledge about the test result 18. By way of example, the control device 28 might be able to evaluate the measure of the uniform distribution of the bit sequence 14, which is possibly contained in the signal 32, in respect of one or more threshold values, to carry out a temporal correlation with preceding test results, for example in order to recognize temporal patterns, or the like.

By way of example, using a control signal 34, the control device 28 is able to control the decryption device 22 to the effect of the latter decrypting or not decrypting the bit sequence 14. What can be achieved as a result is that a decrypted bit sequence 36 is for example only obtained if the test device 12 provides an appropriate test result and the control device 28 is configured to evaluate the test result 18 and, dependent on the test result 18, allows or prevents a decryption of the bit sequence 14.

To be able to determine the measure of the uniform distribution with great reliability, the distribution may be considered over the entire bit sequence 14 and/or there may be a more detailed observation.

Figure 3:
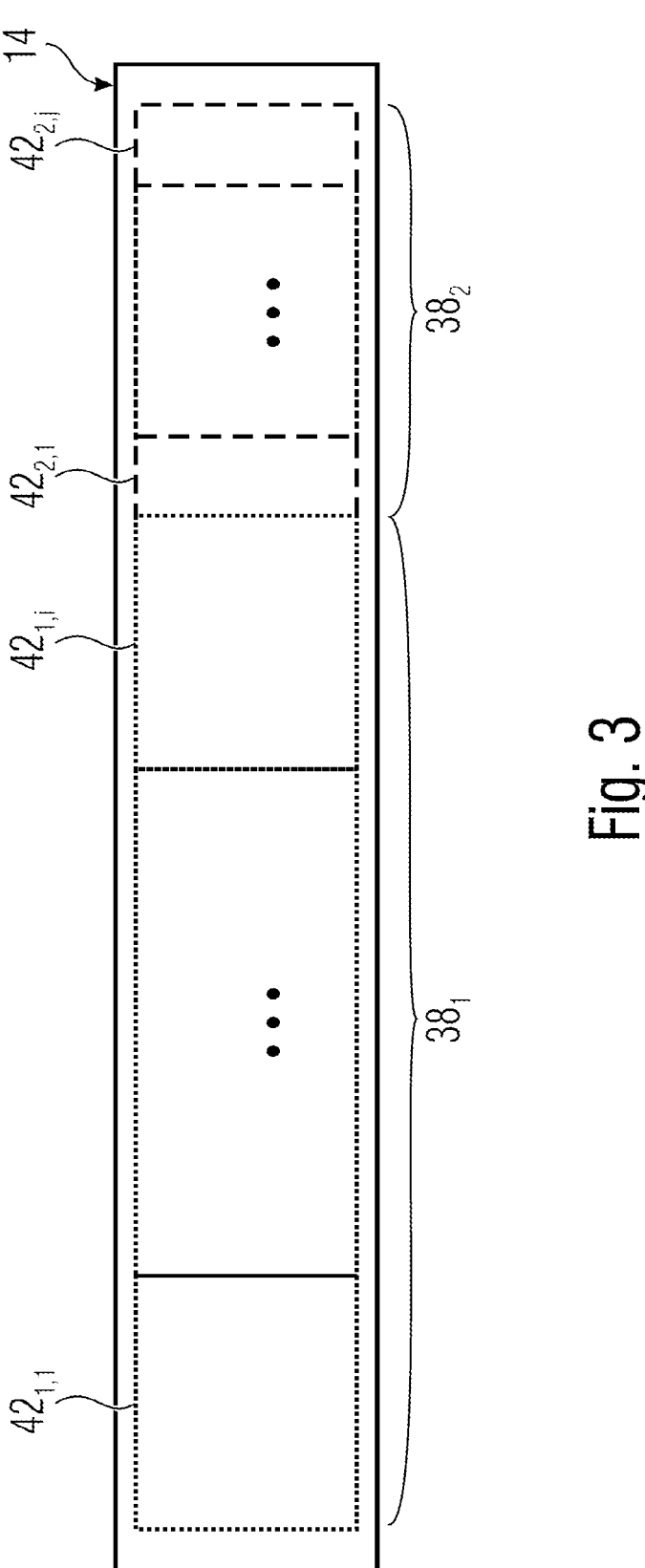
FIG. 3 shows a schematic representation of a bit sequence for explaining advantageous configurations of exemplary embodiments described herein.

FIG. 3 shows a schematic representation of the bit sequence 14 for explaining advantageous configurations of apparatuses described herein. By way of example, such functions may be implemented in the test device 12, with, however, a split of the bit sequence 14 into parts or segments, for example, also being able to be carried out before the execution of the respective test.

According to exemplary embodiments, the apparatus 10 and/or 20 is configured to decompose the encrypted bit sequence 14 into two or more parts $38_1$ and $38_2$. In this case, the number of parts can be adapted to meet system requirements and may total at least 2, at least 3, at least 4, at least 5 or more. In the present representation of FIG. 3, the apparatus 10 or 20 is configured to decompose the bit sequence 14 into two parts $38_1$ and $38_2$. The number of parts into which the bit sequence 14 is decomposed may completely comprise said bit sequence 14. The parts $38_1$ and $38_2$ may be without redundancy, that is to say each bit of the bit sequence 14 may be uniquely assigned to one of the parts $38_1$ and $38_2$.

The test device 12 may be configured to subject each part $38_1$ and $38_2$ to the statistical test in view of the expected distribution of bits in order to obtain a respective partial test result. This means that a first partial test result may indicate a result of the test for the part $38_1$ and a second partial test result may indicate a result of the statistical test for the part $38_2$. The apparatus 10 and/or 20 may be configured to decrypt the bit sequence 14 if each partial test result indicates that the distribution follows the expected distribution.

Optionally, the apparatus may be configured to link the decryption to a further predetermined criterion such that the bit sequence is decrypted if each partial test result indicates that the distribution follows the expected distribution and every part follows a predetermined further criterion. By way of example, the further criterion may relate to whether the procedure should continue and/or how the procedure should continue, for example within the meaning of "go or no-go". Expressed differently, should at least one of the partial test results indicate that the distribution in the evaluated part does not follow the expected distribution, then a negative result can be obtained overall or the decryption remains undone. Expressed differently, exemplary embodiments may provide for a decryption only to be carried out if each partial test result indicates that the respective part follows the expected distribution.

This means that decryption can be made to be dependent on whether each partial test result indicates that the respective part $38_1$ and $38_2$ follows the expected distribution and, optionally, an additional criterion may also be applied to one or more of the parts. The parts $38_1$ and $38_2$ may be of the same or a different size, with a size being able to relate to the number of bits contained therein.

According to an exemplary embodiment, the parts $38_1$, $38_2$ and/or optional further parts may also be decomposed.

By way of example, the part $38_1$ can be subdivided into a number i of components $42_{1,1}$ to $42_{1,i}$ with i>1, where the components $42_{1,1}$ to $42_{1,i}$ may relate to components of the part $38_1$ and may in the entirety thereof fully form the part $38_1$. In a similar manner, the part $38_2$ may be subdivided into components $42_{2,1}$ to $42_{2,j}$ with j>1. The components $42_{2,1}$ bis $42_{2,j}$, may form the part $38_2$ in full. The components $42_{1,1}$ to $4_{1,i}$ of the part $38_1$ may have different sizes from one another or the same size as one another. Likewise, the components $42_{2,1}$ to $42_{2,j}$ may have different sizes from one another or the same size as one another. The components $42_{1,1}$ to $42_{1,i}$ of the part $38_1$ may have the same size as or a different size compared to the components $42_{2,1}$ to $42_{2,j}$.

According to some embodiments, the components of a part $38_1$ or $38_2$ differ between the parts and are the same within the respective part, that is to say the components $42_{1,1}$ to $42_{1,i}$ may have the same size in comparison with one another and the components $42_{2,1}$ to $42_{2,j}$ may have the same size in comparison with one another while the components $4_{1,1}$ to $42_{1,i}$ may have a different size in comparison with the components $42_{2,1}$ to $42_{2,j}$. The first partial test result may be obtained on the basis of an evaluation of the components $42_{1,1}$ to $42_{1,i}$ and the second partial test result may be obtained on the basis of an evaluation of the components $42_{2,1}$ to $42_{2,j}$.

If the explanatory but not necessarily restrictive example of the Kyber and/or Saber cryptosystem is used, the encrypted bit sequence 14 can be subdivided into two parts $38_1$ and $38_2$. The parts $38_1$ and $38_2$ may differ from one another in terms of size. Then, each part can be divided into a plurality or a multiplicity of components of the same size and the distribution can then be verified on the basis of these components. As mentioned, the size of the components 42 may differ between the respective parts. By way of example, the encrypted bit sequence 14 may for example contain 768 bytes for Kyber 512. One part, for example the part $38_1$, may for example be obtained such that the latter contains 640 bytes while the other part may contain 128 bytes. The part comprising 640 bytes may be further subdivided, for example into 512 components $42_{1,1}$ to $42_{1,512}$, each of 10 bits. The remaining part may for example be subdivided into 256 components $42_{2,1}$ to $42_{2,256}$, each with 4 bits. A statistical test can verify the distribution of the 512 components of the part $38_1$, for example by means of a collision test. Moreover, a statistical test can verify the distribution of the 256 components of the part $38_2$, for example by means of a collision test.

Only if both the tests are satisfied can be used as an exemplary criterion to prompt the decryption of the bit sequence 14.

According to exemplary embodiments, the bit sequence can be encrypted in correspondence with a symmetric encryption and/or an asymmetric encryption, for example ECC, or in lattice-based fashion.

Figure 4:
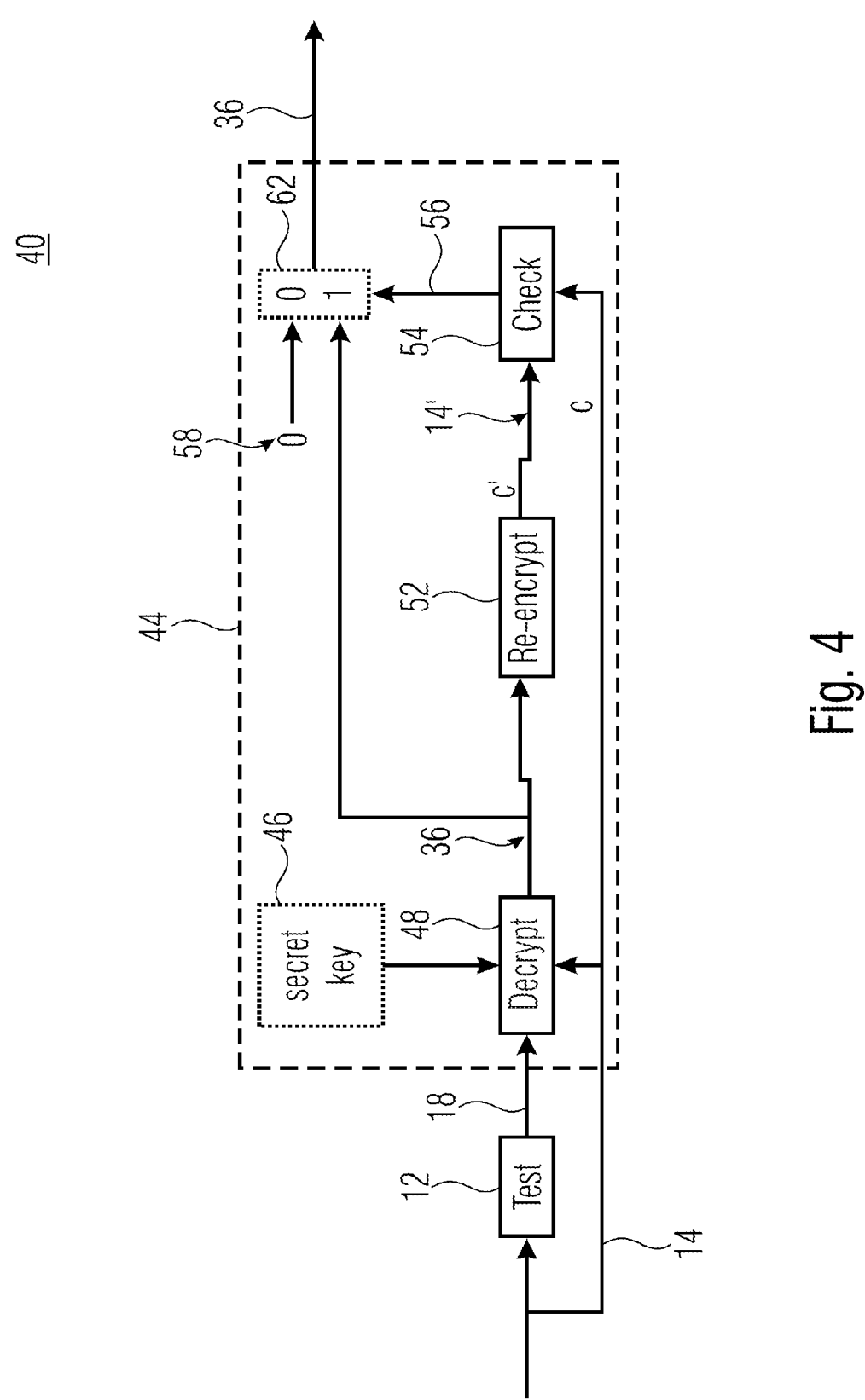
FIG. 4 shows a schematic block diagram of an apparatus according to an exemplary embodiment, which comprises a decryption device.

FIG. 4 shows a schematic block diagram of an apparatus 40 according to an exemplary embodiment.

By way of example, the apparatus 40 may be part of what is known as a smart card, as is also possible for the apparatuses 10 and/or 20.

The apparatus 40 comprises the test device 12 and a decryption device 44, which may for example implement the decryption device 22 of the apparatus 10 and/or 20.

The decryption device 44 comprises a key memory 46, in which a secret key is stored and which may be protected from external access.

A block 48 labeled "decrypt" may, on the basis of the test result 18, provide the decrypted that sequence 36 from the encrypted bit sequence 14.

A part of the decryption device 44 may be an encryption block 52, which is circuitry configured to re-encrypt the decrypted bit sequence 36 in order to obtain an encrypted bit sequence 14'. The latter is also labeled as c' and may be compared with the encrypted bit sequence 14, labeled by c, in a comparison device 54, to the effect of whether there is a correspondence between the bit sequence 14 and the newly obtained encrypted bit sequence 14'. By way of example, the decrypted bit sequence 36 may be output on the basis thereof, for example if a verification result 56 indicates that the bit sequences 14 and 14' correspond. Otherwise, it is possible to output error information 58 instead of the decrypted bit sequence 36, for instance by virtue of both items of information, the decrypted bit sequence 36 and the error information 58, being provided at inputs of a multiplexer 62 which may be controlled by the verification result 56.

The preliminary test by means of the test device 12 enables the reduction or avoidance of information outflow as a result of the decryption of the bit sequence in block 48. A faulty or maliciously generated encrypted bit sequence 14 could be discovered by means of the comparison device 54, but the bit sequence 14 has already been decrypted at this point in time and information could be revealed if this operation is eavesdropped on. This can be reduced or even prevented by the advance testing of the bit sequence 14.

FIG. 4 indicates that an apparatus according to the exemplary embodiments may comprise a decryption device 44 or 48, which is configured to decrypt the bit sequence 14 using a secret stored in the key memory 46 in order to obtain the decrypted bit sequence 36. The apparatus comprises an encryption device 52 configured to encrypt the decrypted bit sequence 36 in order to obtain a re-encrypted bit sequence 14'. The apparatus is configured to compare the bit sequence 14 with the re-encrypted bit sequence 14' in order to obtain a comparison result 56, and to output an alarm signal for instance by outputting the error information 58, if the comparison result indicates a deviation between the bit sequence 14 and the re-encrypted bit sequence 14'.

The apparatuses 10, 20 and/or 40 may be formed as secured computing devices, for example as a secure element.

Expressed differently, exemplary embodiments consider the identification of chosen ciphertext attacks within the scope of lattice-based cryptosystems.

Many lattice-based cryptosystems are based on the RLWE or MLWE problem. In these systems, encryption is implemented by masking the encrypted message with an RLWE sample $p \cdot e_1 + e_3$ (or an MLWE sample), which is based on the public key p. On account of the RLWE assumptions, the ciphertext generated is uniformly distributed in $R_q$.

During the decryption process, the input ciphertext can be combined in calculations with the secret polynomial s. Therefore, this step is particularly susceptible to side channel attacks on account of its dependence on the secret. A plurality of attacks combine side channel information (electromagnetic field or power) of this step (e.g., the calculation of the NTT) with a chosen ciphertext attack. By way of example, in an attack described by Ravi et al., a ciphertext may be input, in which virtually all coefficients are set to zero in order to examine a secret coefficient using side channel information.

However, the manipulated ciphertext might only be detected in the decryption device 44 at the end, once the encryption in block 52 re-encrypts the decrypted ciphertext, for example using a Fujisaki-Okamoto transform, and determines a non-correspondence. However, side channel information has already leaked at this time, and the attacker may have learned enough to obtain secret information.

In this respect, exemplary embodiments provide a method and an apparatus for preventing the processing of what are known as chosen ciphertext (non-genuinely generated ciphertext) on the basis of a statistical test, which is intended to be carried out on the distribution of the collisions of coefficients in the ciphertext polynomial.

Let n denote the degree of the polynomial to be tested. The coefficients of the corresponding polynomial u of a valid ciphertext are uniformly distributed in $R_q$. The compression of coefficients in Kyber reduces the range of possible values for the compressed ciphertext to $[0, \ldots, 2^{d_u}-1]$ for u. This distribution is no longer uniform since there is a (very small) distortion, but the latter may be ignored for this test. Initially, a collision is defined as a recurring coefficient (i.e., should three zeros arise, this equals two collisions). In this case, the expected values for the number of collisions in the case of n coefficients is:

$$N_{koll} = \sum_{k=0}^{n-1} \sum_{i=0}^{2^{d_u}-1} \binom{n}{k+1} p_i^{k+1} (1 - p_i)^{n-k-1} k$$

$$= \sum_{k=0}^{n-1} \binom{n}{k+1} p_i^{k+1} (1 - p_i)^{n-k-1} k 2^{d_u}$$

$$= 2^{d_u} \sum_{k=0}^{n-1} \binom{n}{k+1} p_i^{k+1} (1 - p_i)^{n-k-1} k$$

where $p_i$ denotes the probability that a coefficient has the value of i. The following applies to a valid ciphertext (in which the coefficients are uniformly distributed):

$$p_i \approx \frac{1}{2^{d_u}}, i \in \{0, \ldots, 2^{d_u} - 1\}$$

Figure 5:
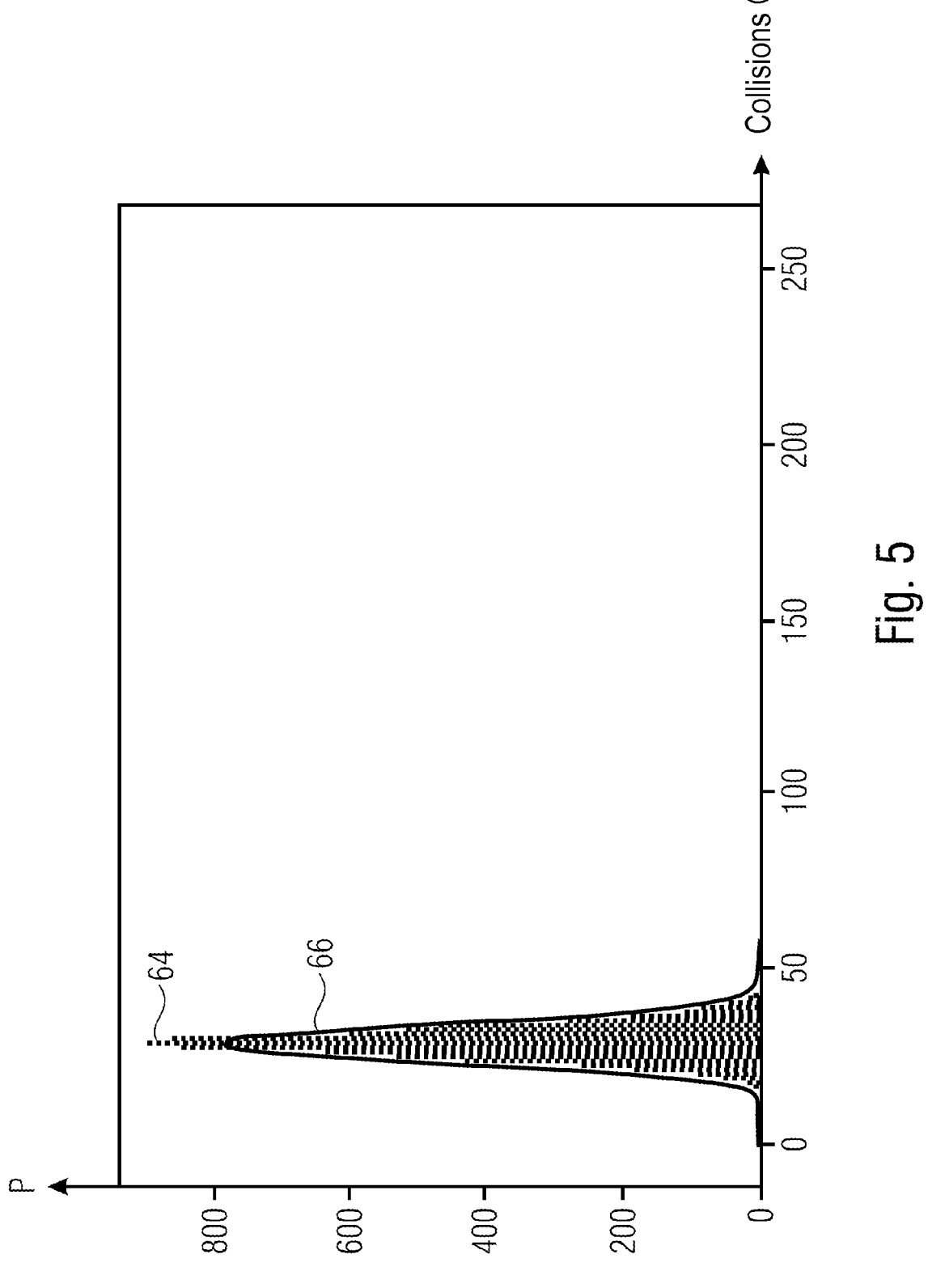
FIG. 5 shows an exemplary collision distribution for 10 000 valid ciphertexts and a binomial approximation in this respect.

The random variable for the number of collisions in a polynomial is denoted by C. In the case of valid ciphertexts, C.C may be approximated by a binomial distribution with the parameters $p_0 = N_{koll}/n$ and n (n=256 for Kyber); see FIG. 5. FIG. 5 shows, in exemplary fashion, a real collision distribution 64 for 10 000 valid ciphertexts and, further, a binomial approximation 66, with the abscissa representing the number of collisions C and the ordinate representing the parameter p, which specifies how often the respective value of C has occurred in the 10 000 experiments, that is to say the likelihood of the value. Different distributions than the uniform distribution increase the expected value of C.

Figure 6:
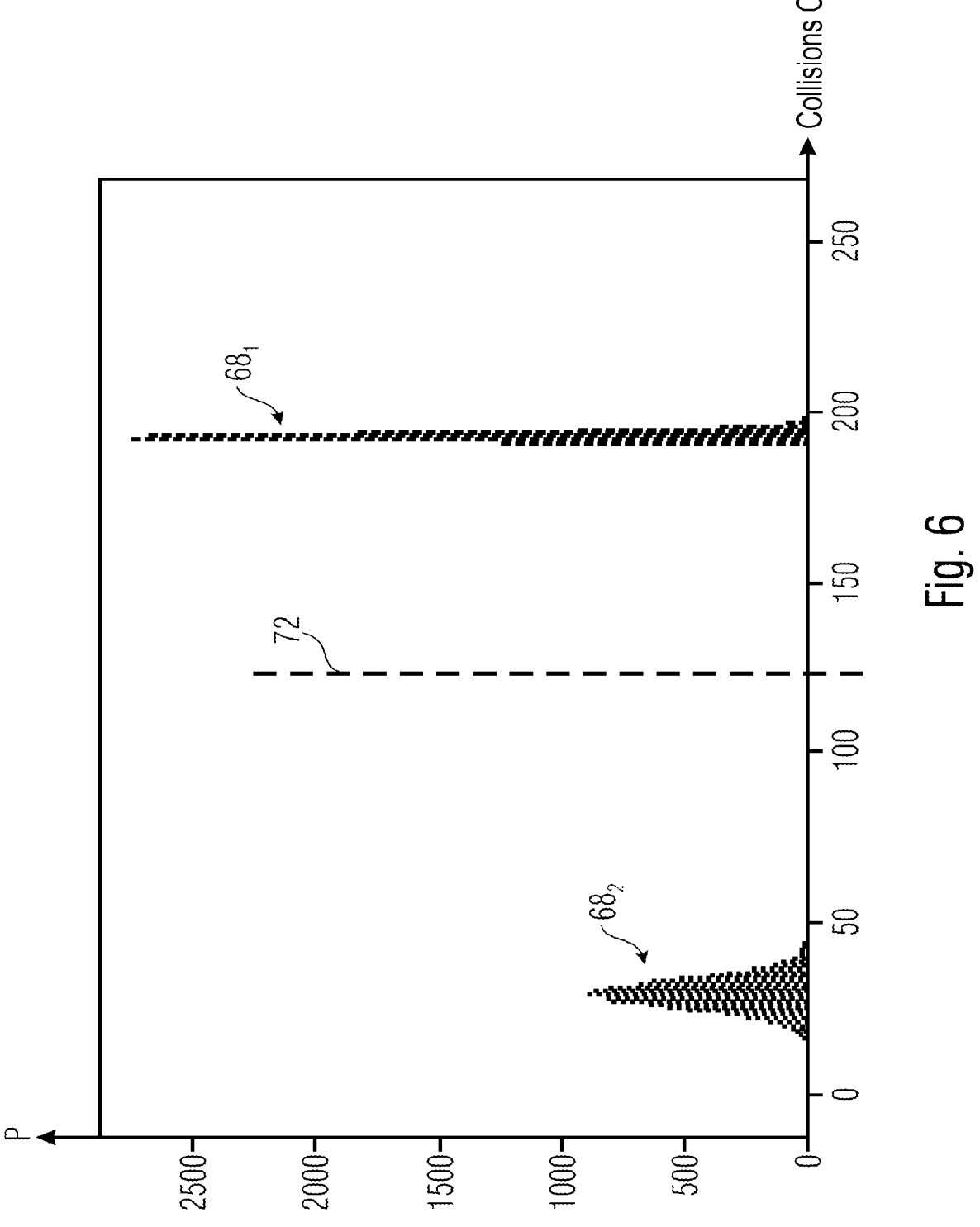
FIG. 6 shows a schematic representation of a binomial test and a calculation of a threshold value for the use in exemplary embodiments.

A polynomial or a bit sequence 14 may be rejected or accepted if the number of collisions (a measure of the uniform distribution) is too large or too small for the significance level a, that is to say if the distribution does not follow the expected distribution, where the expected distribution may be based on the binomial distribution, for example, or correspond to the latter, for example taking account of a deviation of no more than 10%, no more than 5% or no more than 1%, or no deviation at all. This can be achieved by a binomial test and the calculation of the corresponding threshold values for the distribution, for example as depicted in FIG. 6. The latter shows a graph in which the number of collisions is plotted along the abscissa and the ordinate indicates how often the value was observed during 10 000 experiments. A curve $68_1$ originates from a sparse polynomial, possibly provided by an attacker, and may be rejected, test result 18n. By contrast, a distribution of $68_2$ may originate from a valid polynomial and may lead to a test result 18p, for instance taking account of a threshold 72.

By way of example, binom_test(x, d, k) may be used as a function for obtaining the distribution or the measure of the uniform distribution and may for example be defined as:

binom_test

Inputs: a vector of polynomials $x=(x_1, x_2, \ldots, x_k)$, a compression parameter d and the length of the vector k Outputs: p value of the likelihood function 1. Count the occurrence of each value $[0, \ldots, 2^d-1]$ in polynomial $x_i$
2. Count the overall collisions, save these as $C_i$
3.

$$p = \min_i \sum_{j=C_i}^{n} \binom{n}{j} p_0^j (1-p_0)^{n-j}$$

is calculated 4. p is returned

This means an apparatus can be configured to determine the expected distribution of the bits in the bit sequence on the basis of a vector of polynomials, a length of the vector and a compression parameter, which specifies a compression of the polynomial coefficients in the vector.

The attacks as per Ravi et al. would be prevented without significant increases in costs since the thresholds for a polynomial u or v may be calculated in advance. It is then sufficient to define a threshold of the collisions C_i; the calculation of the value p can be dispensed with. This would reduce the complexity of the step 3 of the binom_test algorithm to a comparison (or two comparisons for a two-sided test).

In summary, the algorithm for a protected CCA.Decaps vis-á-vis chosen ciphertext-assisted side channel attacks can be formulated as follows:

Kyber.CCA.Decaps_statTest
Inputs: compressed u and v, sk
Outputs: commonly used secret key K
1. $p_u$=binom_test(u, $d_u$, $k_{kyber}$)
2. $p_v$=binom_test(v, $d_v$, $k_{kyber}$)
3. if ($p_u$<0.001 or $p_v$<0.001)
   a. trigger fault
4. otherwise
   a. Kyber. CCAKEM. Dec(c, sk)

This approach can be expanded to other KEMs such as Saber.

Figure 7:
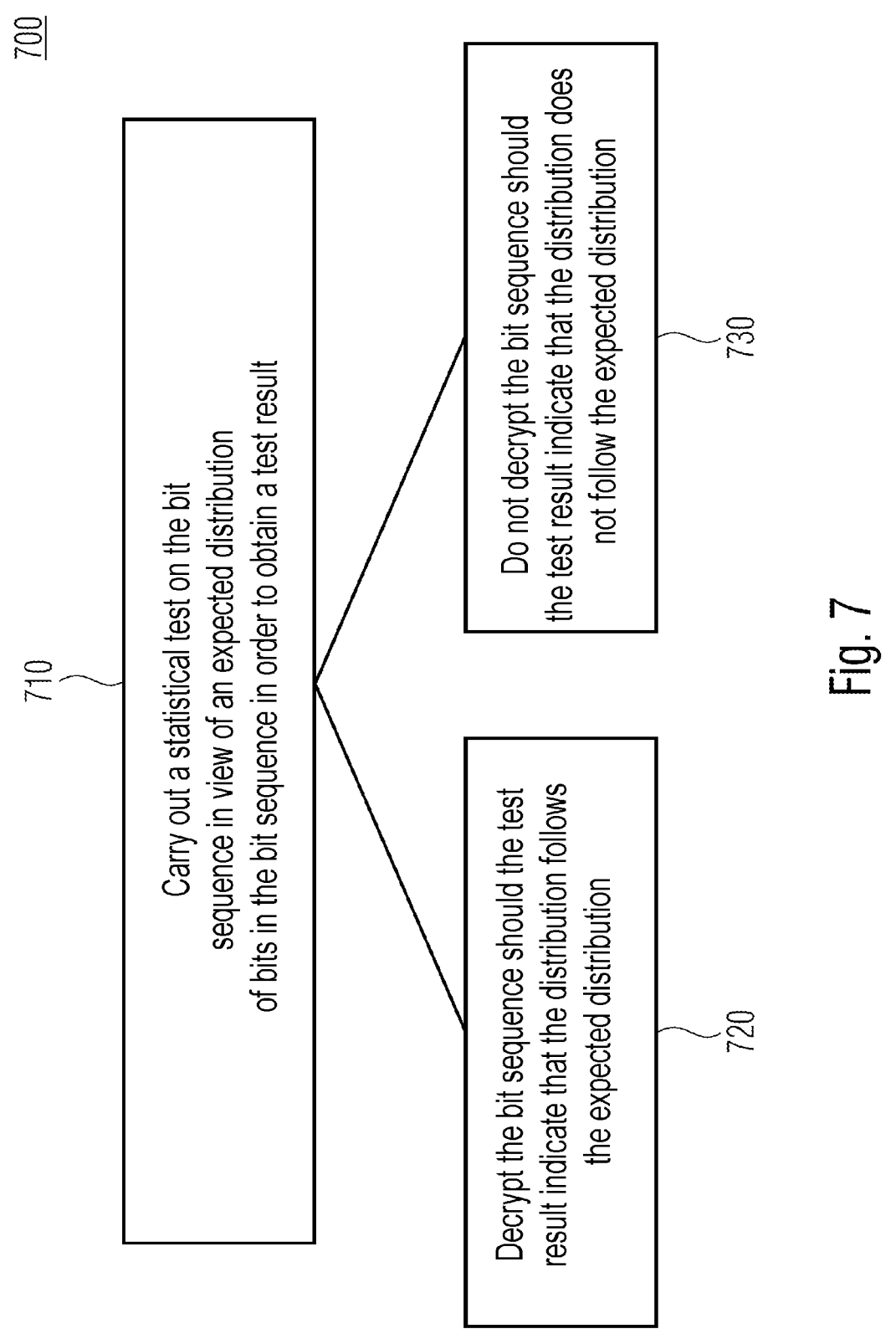
FIG. 7 shows a schematic flowchart of a method according to one exemplary embodiment.

FIG. 7 shows a schematic flowchart of a method 700 which can be used to decrypt an encrypted bit sequence. A step 710 comprises carrying out a statistical test on the bit sequence in view of an expected distribution of bits in the bit sequence in order to obtain a test result. A step 720 comprises a decryption of the bit sequence should the test result indicate that the distribution follows the expected distribution. Alternatively, as shown by block 730, the bit sequence is not decrypted should the test results indicate that the distribution does not follow the expected distribution. Block 730 can firstly be carried out as an active step, or else already in passive fashion, for instance by being brought about or satisfied by not carrying out step 720.

The examples described here may be realized as commands that are processed by a data processing apparatus such as a personal computer, a microcontroller or a smart-card.

Figure 8:
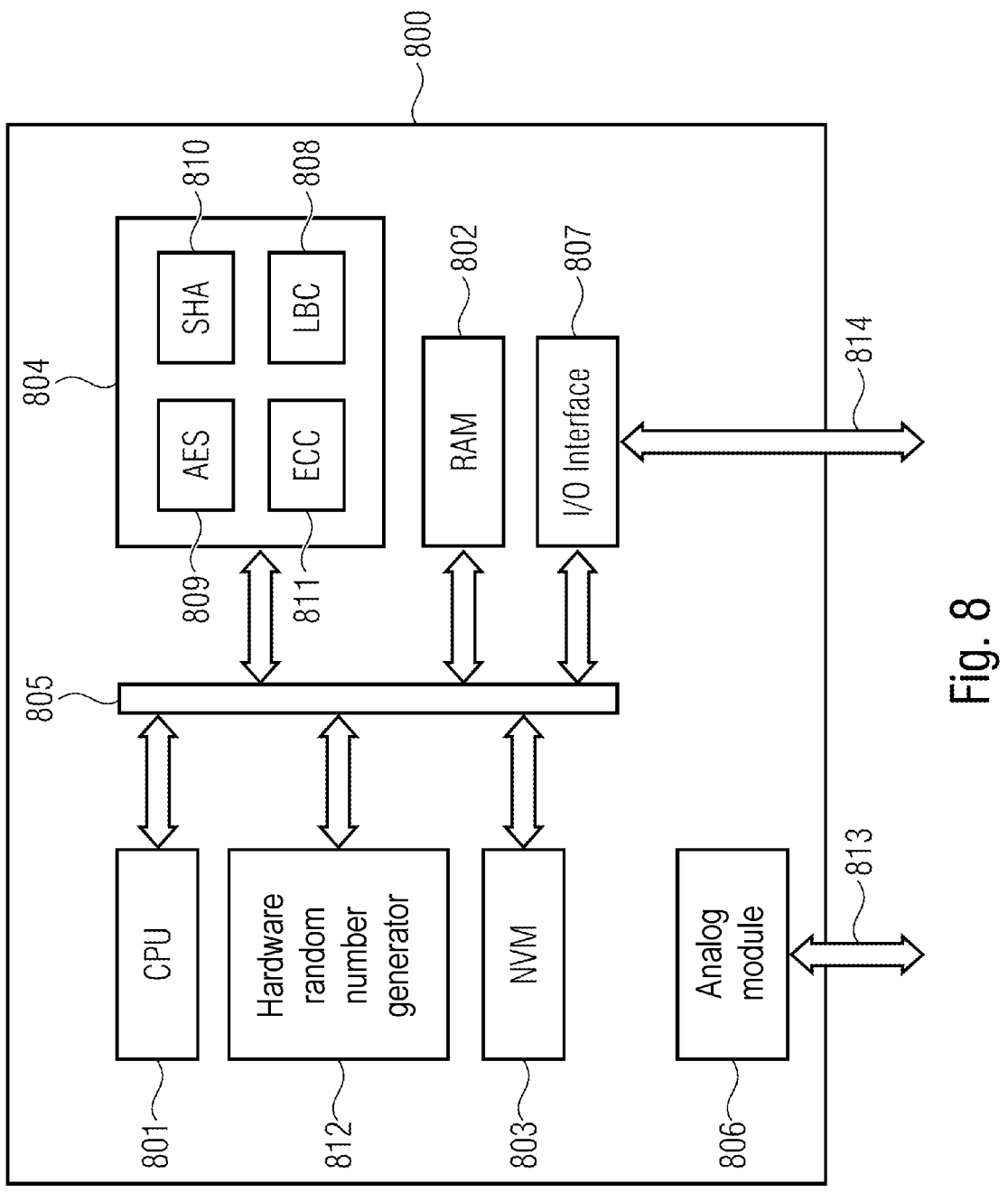
FIG. 8 shows a processing apparatus according to an exemplary embodiment, comprising a CPU, a RAM, a non-volatile memory, a crypto module, an analog module, an input/output interface and a hardware random number generator.

FIG. 8 shows a processing apparatus 800 comprising a CPU 801, a RAM 802, a non-volatile memory (NVM) 803, a crypto module 804 comprising cryptographic circuitry, an analog module 806 comprising analog circuitry, an input/output interface 807 comprising interface circuitry, and a hardware random number generator 812.

In this example, the CPU 801 has access to at least one crypto module 804 by way of a commonly utilized bus 805, to which each crypto module 804 is coupled. In particular, each crypto module 804 may have one or more crypto cores, in order to carry out certain cryptographic processes. Exemplary crypto cores include:

an AES core 809,
an SHA core 810,
an ECC core 811 and
a lattice-based crypto (LBC) core 808.

The lattice-based crypto core 808 may be provided to accelerate lattice-based cryptography.

The CPU 801, the hardware random number generator 812, the NVM 803, the crypto module 804, the RAM 802 and the input/output interface 807 are connected to the bus 805. The input/output interface 807 may have a connection 814 to other apparatuses which may be similar to the processing apparatus 800.

The analog module 806 is supplied with electrical power 813 via an electrical contact and/or via an electromagnetic field. This power serves to control the circuit arrangement of the processing apparatus 800 and, in particular, may allow the input/output interface to initiate, establish and/or maintain connections to other apparatuses via the connection connector 814.

The bus 805 itself may or may not be masked. Commands for carrying out the steps described here may, in particular, be stored in the NVM 803 and processed by the CPU 805. The processed data may be stored in the NVM 803 or in the RAM 802. Supporting functions may be provided by the crypto modules 804 (e.g., expansion of pseudorandom data). Random numbers may be made available by the hardware random number generator 812.

The steps of the method described here may be carried out exclusively or at least partially on the crypto module 804, for example in the lattice-based crypto core 808. A crypto module 804 may or may not be equipped with hardware-based security features. Such hardware-based security features may be circuits which implement countermeasures in relation to a side channel power analysis or fault injection (e.g., by way of a laser). Such countermeasures may be realized by the use of randomness, redundant hardware or redundant processing.

To carry out the steps disclosed within this invention, commands may be stored in the lattice-based crypto core 808 or may be provided by the CPU 801 by the bus 805. Data may be stored locally in the lattice-based crypto core 808. There is also the option for data to be stored temporarily in the RAM 802 or in the NVM 803. The lattice-based crypto core 808 may also use other crypto modules in order to provide assisting functions (e.g., expansion of pseudo-random data). The lattice-based crypto core 808 may also comprise a hardware random number generator 812 or a device for generating physical random numbers and/or software random numbers The lattice-based crypto core 808 may support operations such as polynomial addition or polynomial multiplication on data structures such as arrays of coefficients, or the sampling of random polynomials.

In another case, the disclosed steps of the invention may be realized as a fixed CMOS circuit in the lattice-based crypto core 808, which is not directly controlled by the CPU 801 and in which no intermediate values are available outside of the crypto core 808. Moreover, the accelerator may implement specific methods described in the literature, for example NewHope key exchange, Kyber encryption with public key or GLP signature methods. In this case, the CPU 801 may only be provided with higher-level functions. By way of example, it is possible to generate a signature by virtue of a message and a private key being transmitted to the lattice-based crypto core 808 via the bus 805 and a GLP signature then being calculated, the latter being called by the CPU 801 with the aid of the bus 805 for further processing.

The processing apparatus 800 may be a chip card/smart-card which is supplied with power by direct electrical contact or by way of an electromagnetic field. The processing apparatus 800 may be a fixed circuit or may be based on reconfigurable hardware (e.g., field programmable gate array, FPGA). The processing apparatus 800 may be connected to a personal computer, a microcontroller, an FPGA, a smartphone system on a chip (SoC) or other components of a smartphone. The processing apparatus 800 may be a chip which acts as a trusted platform module (TPM) and offers cryptographic functions (secure storage, secure time, signature creation and validation, certification) in accordance with a standardized interface for a computer, a smart-phone, an Internet of things (IoT) apparatus or an automobile.

Figure 9:
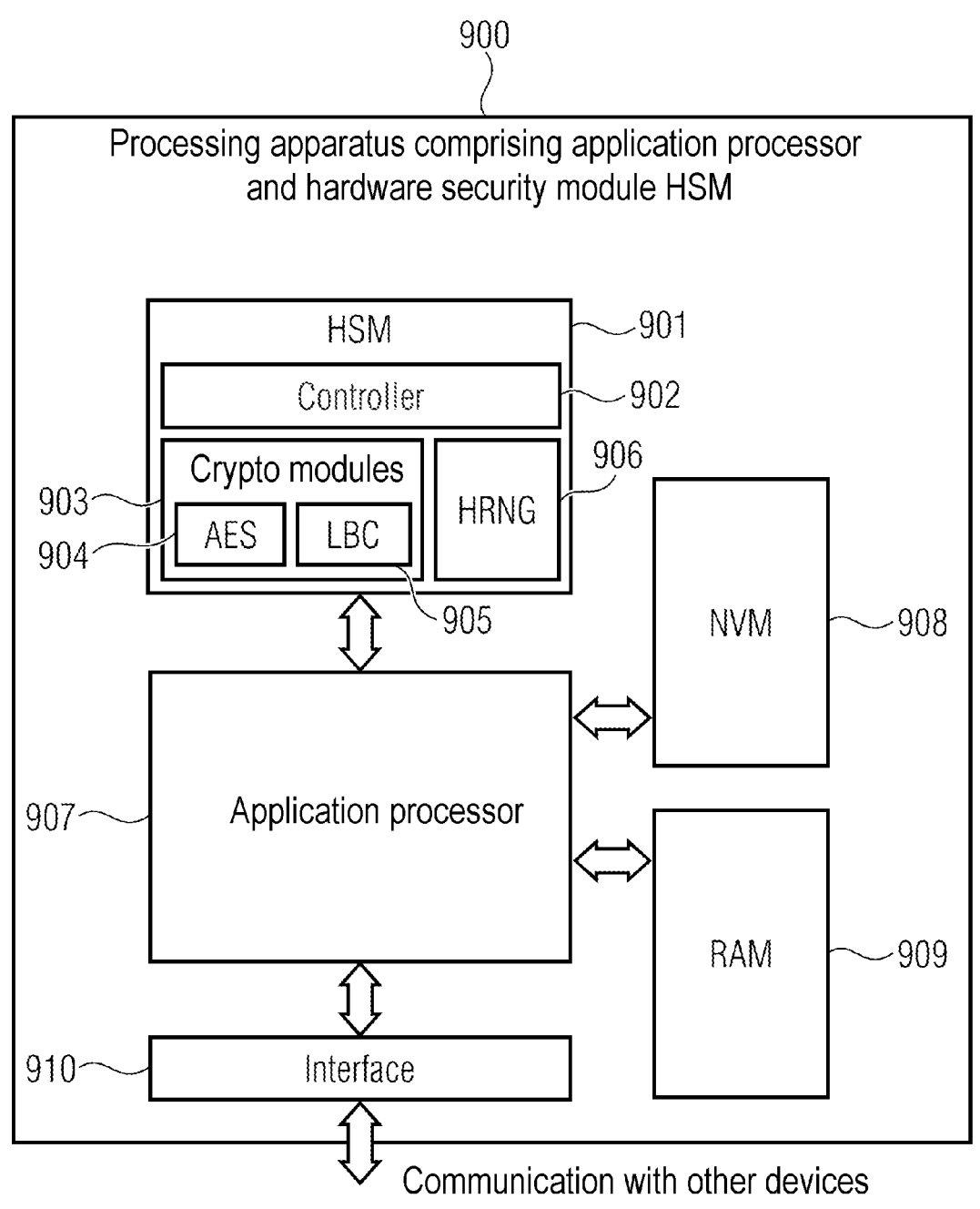
FIG. 9 shows a processing apparatus according to an exemplary embodiment, comprising an application processor and a hardware security module.

FIG. 9 shows a processing apparatus comprising an application processor and a hardware security module (HSM) 900, which includes an HSM 901, an application processor 907, an NVM 908, a RAM 909 and an interface 910. The HSM 901 consists of a controller 902 and a number of crypto modules 903. Exemplary cores in the crypto module 903 are an AES core 904 and a lattice-based crypto (LBC) core 905.

In this instantiation, a hardware security module (HSM) 901 and an application processor 907 which may be established on the same physical chip with tight coupling are described. The HSM 901 offers cryptographic services and secured key storage, while the application processor carries out computationally intensive tasks (e.g., image recognition, communication, motor control). The HSM 901 is distinguished in that it is only accessible via a defined interface and is considered independent of the remaining system such that an impaired security of the application processor 907 only has limited effects on the security of the HSM 901. The HSM 901 may or may not carry out all or a subset of the tasks described in relation to the processing apparatus 800 using the controller 902, the LBC 905, assisted for example by an AES 904 and an HRNG 906. It is able to carry out the steps described in this invention, either under control by an internal controller or as a CMOS circuit. Moreover, the application processor 907 can also carry out the steps described in the present invention. The processing apparatus comprising application processor and hardware security module 900 may be used as a central communications gateway or (electrical) motor control unit in automobiles or other vehicles.

The examples proposed herein may be based in particular on at least one of the solutions set forth below. In particular, it is possible to use combinations of the features set forth below in order to obtain a desired result. The features of the method may be combined with one or more features, as desired, of the apparatus, the piece of equipment or the system, or vice versa.

Exemplary embodiments mentioned herein are once again described below using different phrasing.

A first aspect describes an apparatus for decrypting an encrypted bit sequence, comprising:

a test circuitry configured to subject the bit sequence to a statistical test in view of an expected distribution of the bits (16) in the bit sequence (14) in order to obtain a test result (18; 18$p$; 18$n$);

the apparatus being configured to decrypt the bit sequence (14) should the test result (18$p$) indicate that the distribution follows the expected distribution; and to not decrypt the bit sequence (14) should the test result (18$n$) indicate that the distribution does not follow the expected distribution.

An aspect 2 describes an apparatus according to aspect 1, wherein the test circuitry is configured to determine a measure of the uniform distribution in the encrypted bit sequence (14) by means of the statistical test; the test circuitry being configured to provide the test result (18) with information specifying the measure; or specifying whether the measure at least reaches a predefined threshold value;

the apparatus comprising a control circuitry configured to evaluate the test result (18; 18$p$; 18$n$) and to allow or prevent a decryption of the bit sequence on the basis of the test result.

An aspect 3 describes an apparatus according to aspect 1 or 2, formed as part of a lattice-based cryptosystem.

An aspect 4 describes an apparatus according to any one of the preceding aspects, configured to decompose the encrypted bit sequence (14) into a plurality of parts (38$_1$, 38$_2$) and to subject each part of the plurality of parts (38$_1$, 38$_2$) to the statistical test in view of the expected distribution of bits in order to obtain a respective partial test result;

the apparatus being configured to decrypt the bit sequence (14) should each partial test result indicate that the distribution follows the expected distribution; and to not decrypt the bit sequence (14) should at least one of the partial test result indicate that the distribution does not follow the expected distribution.

An aspect 5 describes an apparatus according to aspect 4, configured to decompose at least a first part (38$_1$) into a first plurality of components (42$_{1,1}$ to 42$_{1,i}$) of equal length and to obtain the first partial test result on the basis of an evaluation of the first plurality of components ($42_{1,1}$ to $42_{1,i}$), and to decompose a second part ($38_2$) into a second plurality of components ($42_{2,1}$ to $42_{2,j}$) of equal length and to obtain the second partial test result on the basis of an evaluation of the second plurality of components ($42_{2,1}$ to $42_{2,j}$).

An aspect 6 describes an apparatus according to any one of the preceding aspects, configured to decompose the encrypted bit sequence into a plurality of parts ($38_1$, $38_2$) and to subject each part of the plurality of parts ($38_1$, $38_2$) to the statistical test in view of the expected distribution of bits in order to obtain a respective partial test result;

the apparatus being configured to decrypt the bit sequence (14) should each partial test results indicate that the distribution follows the expected distribution and follows a predetermined further criterion.

An aspect 7 describes an apparatus according to any one of the preceding aspects, configured to decrypt the bit sequence in correspondence with a symmetric encryption or an asymmetric encryption.

An aspect 8 describes an apparatus according to any one of the preceding aspects, configured to produce a signal (26) which specifies that the distribution does not follow the expected distribution.

An aspect 9 describes an apparatus according to any one of the preceding aspects, comprising a decryption device (44) which is configured to decrypt the bit sequence (36) using a secret in order to obtain a decrypted bit sequence;

the apparatus comprising an encryption device (52) configured to encrypt the decrypted bit sequence (36) in order to obtain a re-encrypted bit sequence (14);

the apparatus being configured to compare the bit sequence (14) with the re-encrypted bit sequence (14) in order to obtain a comparison result (56); and the apparatus being configured to output an alarm signal should the comparison result (56) indicate a deviation between the bit sequence (14) and the re-encrypted bit sequence (14).

An aspect 10 describes an apparatus according to any one of the preceding aspects, formed as a secure computing device.

An aspect 11 describes a method (700) for verifying an encrypted bit sequence, including the following steps:

carrying out (710) a statistical test on the bit sequence in view of an expected distribution of bits in the bit sequence in order to obtain a test result;

decrypting (720) the bit sequence should the test result indicate that the distribution follows the expected distribution; or not decrypting the bit sequence should the test result indicate that the distribution does not follow the expected distribution.

An aspect 12 describes a method according to aspect 11, further including:

determining a measure of a uniform distribution in the encrypted bit sequence (14) by means of the statistical test; and providing the test result (18; $18p$; $18n$) with information specifying the measure; or specifying whether the measure at least reaches a predefined threshold value;

evaluating the test result (18; $18p$; $18n$) and allowing or preventing a decryption of the bit sequence (14) on the basis of the test result.

Aspect 13 describes a method according to aspect 11 or 12, carried out as part of a lattice-based cryptosystem.

An aspect 14 describes a method according to any one of aspects 11 to 13, further including:

decomposing the encrypted bit sequence (14) into a plurality of parts ($38_1$, $38_2$) and subjecting each part of the plurality of parts to the statistical test in view of the expected distribution of bits in order to obtain a respective partial test result;

decrypting the bit sequence (14) should each partial test result indicate that the distribution follows the expected distribution; and not decrypting the bit sequence (14) should at least one of the first partial test result and the second partial test result indicate that the distribution does not follow the expected distribution.

An aspect 15 describes a method according to aspect 14, further including:

dividing at least a first part ($38_1$) into a first plurality of components ($42_{1,1}$ to $42_{1,i}$) of equal length and obtaining the first partial test result on the basis of an evaluation of the first plurality of components ($42_{1,1}$ to $42_{1,i}$); and dividing the second part into a second plurality of components ($42_{2,1}$ to $42_{2,j}$) of equal length and obtaining the second partial test result on the basis of an evaluation of the second plurality of components ($42_{2,1}$ to $42_{2,j}$).

An aspect 16 describes a method according to any one of aspects 11 to 15, further including:

decomposing the encrypted bit sequence (14) into a plurality of parts ($38_1$, $38_2$) and subjecting each part of the plurality of parts to the statistical test in view of the expected distribution of bits in order to obtain a respective partial test result;

decrypting the bit sequence (14) should each partial test result indicate that the distribution follows the expected distribution and follows a predetermined further criterion.

An aspect 17 describes a method according to any one of aspects 11 to 16, wherein the bit sequence is decrypted in correspondence with a symmetric encryption or an asymmetric encryption.

An aspect 18 describes a method according to any one of aspects 11 to 17, further including:

producing a signal (26) which specifies that the distribution does not follow the expected distribution.

An aspect 19 describes a method according to any one of aspects 11 to 18, further including:

decrypting the bit sequence (14) using a secret in order to obtain a decrypted bit sequence (36);

encrypting the decrypted bit sequence (36) in order to obtain a re-encrypted bit sequence (14);

comparing the bit sequence (14) with the re-encrypted bit sequence (14) in order to obtain a comparison result; and outputting an alarm signal should the comparison result (56) indicate a deviation between the bit sequence and the re-encrypted bit sequence.

An aspect 20 describes a method according to any one of aspects 11 to 19, carried out using a secure computing device.

An aspect 21 describes a computer program having program code for carrying out the method according to any one of aspects 11 to 20 when the program is executed on a computing device.

The exemplary embodiments described above relate to apparatuses and to methods. A corresponding apparatus can be configured to implement the corresponding method; conversely, a method according to exemplary embodiments may be implemented on an apparatus configured to this end.

Although some aspects have been described in connection with an apparatus, it is to be understood that said aspects also constitute a description of the corresponding method, with the result that a block or a structural element of an apparatus should also be understood to be a corresponding method step or a feature of a method step. Analogously herewith, aspects which were described in connection with a or as a method step also represent a description of a corresponding block or detail or feature of a corresponding apparatus.

Depending on certain implementation requirements, exemplary embodiments of the invention may be implemented in hardware or software. The implementation can be performed using a digital storage medium, for example a floppy disk, a DVD, a Blu-ray disc, a CD, a ROM, a PROM, an EPROM, an EEPROM or a FLASH memory, a hard disk or another magnetic or optical memory, on which electronically readable control signals are stored that can interact or do interact with a programmable computer system such that the respective method is performed. For this reason, the digital storage medium can be computer readable. Some exemplary embodiments according to the invention thus comprise a data carrier which has electronically readable control signals that are capable of interacting with a programmable computer system such that one of the methods described here is performed.

In general, exemplary embodiments of the present invention can be implemented as a computer program product having a program code, wherein the program code acts to perform one of the methods if the computer program product is executed on a computer. The program code can also be stored, for example, on a machine-readable carrier.

Other exemplary embodiments comprise the computer program for performing one of the methods described here, wherein the computer program is stored on a machine-readable carrier.

In other words, an exemplary embodiment of the method according to the invention is thus a computer program which has a program code for performing one of the methods described herein if the computer program is running on a computer. A further exemplary embodiment of the methods according to the invention is thus a data carrier (or a digital storage medium or computer-readable medium), on which the computer program for performing one of the methods described here is recorded.

A further exemplary embodiment of the method according to the invention is thus a data stream or sequence of signals, which represents or represent the computer program for performing one of the methods described herein. The data stream or the sequence of signals can be configured for example so as to be transferred via a data communication connection, for example via the Internet.

A further exemplary embodiment comprises a processing device, for example a computer or a programmable logic device, which is configured or adapted for performing one of the methods described herein.

A further exemplary embodiment comprises a computer, on which the computer program for performing one of the methods described herein is installed.

In some exemplary embodiments, a programmable logic device (for example a field programmable gate array, FPGA) can be used to perform some or all functions of the methods described here. In some exemplary embodiments, a field programmable gate array can act together with a microprocessor to perform one of the methods described herein. In general, the methods in some exemplary embodiments are performed by any desired hardware apparatus. The latter can be universally usable hardware, such as a computer processor (CPU) or hardware that is specific to the method, such as an ASIC.

The above-described exemplary embodiments are merely an illustration of the principles of the present invention. It is to be understood that modifications and variations of the arrangements and details described in this document will be obvious to others skilled in the art. For this reason, the invention is intended to be limited merely by the scope of protection of the following patent claims rather than by the specific details which have been presented on the basis of the description and the explanation of the exemplary embodiments in this document.

What is claimed is:

1. An apparatus for decrypting an encrypted bit sequence, comprising:
    decryption circuitry configured to perform decryption of bit sequences according to a cryptosystem;
    test circuitry configured to subject the bit sequence to a statistical test in view of an expected distribution of the bits in the bit sequence, to obtain a test result; and
    control circuitry configured to control the decryption circuitry so as to decrypt the bit sequence should the test result indicate that the distribution follows the expected distribution and to not decrypt the bit sequence should the test result indicate that the distribution does not follow the expected distribution.

2. The apparatus of claim 1, wherein the test circuitry is configured to determine a measure of uniformity of distribution in the encrypted bit sequence by means of the statistical test; the test circuitry being configured to provide the test result with information specifying the measure; or specifying whether the measure at least reaches a predefined threshold value, the apparatus comprising control circuitry configured to evaluate the test result and to allow or prevent, on the basis of the test result, a decryption of the bit sequence using the decryption circuitry.

3. The apparatus of claim 1, configured as part of a lattice-based cryptosystem.

4. The apparatus of claim 1, wherein the test circuitry is configured to decompose the encrypted bit sequence into a plurality of parts and to subject each part of the plurality of parts to the statistical test in view of the expected distribution of bits in order to obtain a respective partial test result, and wherein the control circuitry is configured to control the decryption circuitry to decrypt the bit sequence should each partial test result indicate that the distribution follows the expected distribution and to not decrypt the bit sequence should at least one of the partial test results indicate that the distribution does not follow the expected distribution.

5. The apparatus of claim 4, wherein the test circuitry is configured to decompose at least a first part into a first plurality of components of equal length and to obtain the first partial test result on the basis of an evaluation of the first plurality of components and to decompose a second part into a second plurality of components of equal length and to obtain the second partial test result on the basis of an evaluation of the second plurality of components.

6. The apparatus of claim 1, wherein the test circuitry is configured to decompose the encrypted bit sequence into a plurality of parts and to subject each part of the plurality of parts to the statistical test in view of the expected distribution of bits to obtain a respective partial test result, the control circuitry being configured to control the decryption circuitry to decrypt the bit sequence should each partial test result indicate that the distribution follows the expected distribution and follows a predetermined further criterion.

7. The apparatus of claim 1, wherein the decryption circuitry is configured to decrypt the bit sequence in correspondence with a symmetric encryption or an asymmetric encryption.

8. The apparatus of claim 1, wherein the test circuitry is configured to produce a signal that specifies that the distribution does not follow the expected distribution.

9. The apparatus of claim 1, wherein the decryption circuitry is configured to decrypt the bit sequence using a secret in order to obtain a decrypted bit sequence, and wherein the apparatus further comprises encryption circuitry configured to encrypt the decrypted bit sequence in order to obtain a re-encrypted bit sequence, the control circuitry being configured to compare the bit sequence with the re-encrypted bit sequence to obtain a comparison result and to output an alarm signal should the comparison result indicate a deviation between the bit sequence and the re-encrypted bit sequence.

10. The apparatus of claim 1, formed as a secure computing device.

11. A method for verifying a bit sequence encrypted according to a cryptosystem, comprising:

carrying out a statistical test on the bit sequence in view of an expected distribution of bits in the bit sequence in order to obtain a test result;

decrypting the bit sequence according to the cryptosystem should the test result indicate that the distribution follows the expected distribution; or not decrypting the bit sequence should the test result indicate that the distribution does not follow the expected distribution.

12. The method of claim 11, further including:

determining a measure of a uniform distribution in the encrypted bit sequence by means of the statistical test;

providing the test result with information specifying the measure or specifying whether the measure at least reaches a predefined threshold value;

evaluating the test result and allowing or preventing a decryption of the bit sequence on the basis of the test result.

13. The method of claim 11, carried out as part of a lattice-based cryptosystem.

14. The method of claim 11, further comprising:

decomposing the encrypted bit sequence into a plurality of parts and subjecting each part of the plurality of parts to the statistical test in view of the expected distribution of bits in order to obtain a respective partial test result;

decrypting the bit sequence should each partial test result indicate that the distribution follows the expected distribution; and not decrypting the bit sequence should at least one of the first partial test result and the second partial test result indicate that the distribution does not follow the expected distribution.

15. The method of claim 14, further comprising:

dividing at least a first part into a first plurality of components of equal length and obtaining the first partial test result on the basis of an evaluation of the first plurality of components;

dividing the second part into a second plurality of components of equal length; and obtaining the second partial test result on the basis of an evaluation of the second plurality of components.

16. The method of claim 11, further including:

decomposing the encrypted bit sequence into a plurality of parts and subjecting each part of the plurality of parts to the statistical test in view of the expected distribution of bits in order to obtain a respective partial test result;

decrypting the bit sequence should each partial test result indicate that the distribution follows the expected distribution and follows a predetermined further criterion.

17. The method of claim 11, wherein the bit sequence is decrypted in correspondence with a symmetric encryption or an asymmetric encryption.

18. The method of claim 11, further comprising:

producing a signal that specifies that the distribution does not follow the expected distribution.

19. The method of claim 11, further including:

decrypting the bit sequence using a secret to obtain a decrypted bit sequence;

encrypting the decrypted bit sequence to obtain a re-encrypted bit sequence;

comparing the bit sequence with the re-encrypted bit sequence to obtain a comparison result; and outputting an alarm signal should the comparison result indicate a deviation between the bit sequence and the re-encrypted bit sequence.

20. The method of claim 11, carried out using a secure computing device.

\* \* \* \* \*